(12) United States Patent
Zeng

(10) Patent No.: US 11,460,807 B2
(45) Date of Patent: Oct. 4, 2022

(54) GRATING AND THREE-DIMENSIONAL HOLOGRAPHIC DISPLAY DEVICE

(71) Applicant: Xiamen Tianma Micro-Electronics Co., Ltd., Xiamen (CN)

(72) Inventor: Yang Zeng, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/244,392

(22) Filed: Apr. 29, 2021

(65) Prior Publication Data
US 2022/0276608 A1    Sep. 1, 2022

(30) Foreign Application Priority Data

Feb. 26, 2021   (CN) .......................... 202110220729.X

(51) Int. Cl.
*G03H 1/04*      (2006.01)
*H04N 13/302*    (2018.01)
*G03H 1/00*      (2006.01)

(52) U.S. Cl.
CPC ......... *G03H 1/0493* (2013.01); *G03H 1/0005* (2013.01); *H04N 13/302* (2018.05); *G03H 2001/0088* (2013.01); *G03H 2223/14* (2013.01)

(58) Field of Classification Search
CPC ............... G03H 1/0493; G03H 1/0005; G03H 2001/0088; G03H 2223/14; H04N 13/302

USPC .......................................................... 348/51
See application file for complete search history.

(56) References Cited

U.S. PATENT DOCUMENTS

2006/0290777 A1* 12/2006 Iwamoto .............. G03H 1/2294
                                                      348/49
2009/0027603 A1*  1/2009 Samulski .......... G02F 1/133711
                                                     349/123
2009/0303597 A1* 12/2009 Miyawaki ............... G06E 3/003
                                                     359/559

FOREIGN PATENT DOCUMENTS

CN            109975987 A      7/2019

* cited by examiner

*Primary Examiner* — Tung T Vo
(74) *Attorney, Agent, or Firm* — Anova Law Group, PLLC

(57) ABSTRACT

A gating and a 3D holographic display device are provided. The grating includes grating electrodes and spacing pillars disposed between a first substrate and a second substrate opposite to the first substrate. The grating electrodes extend along a first direction and are arranged along a second direction. Along a plane parallel to the first substrate, positions of spacing pillars are referred to as matrix points. The spacing pillars correspond to the matrix points; the matrix points include multiple first matrix point units arranged as an array. A minimum repeating unit of the matrix points includes four first matrix point units located at four vertices of a first quadrilateral. Two adjacent sides of the first quadrilateral are defined as a first unit vector and a second unit vector, respectively; and an angle between the first unit vector and the second unit vector is $\alpha1$, and $0° \leq \alpha1 \leq 90°$.

20 Claims, 13 Drawing Sheets

GRATING AND THREE-DIMENSIONAL HOLOGRAPHIC DISPLAY DEVICE

CROSS-REFERENCE TO RELATED APPLICATION

This application claims the priority of Chinese Patent Application No. 202110220729.X, filed on Feb. 26, 2021, the content of which is incorporated by reference in its entirety.

TECHNICAL FIELD

The present disclosure generally relates to the field of display technology and, more particularly, relates to a grating and a three-dimensional (3D) holographic display device.

BACKGROUND

From the cathode ray tube (CRT) era to the liquid crystal display (LCD) era, to the now coming organic light-emitting diode (OLED) era, the display industry has experienced decades of development and has become increasingly rapid growth. The display industry has been closely related to our lives and is inseparable from traditional mobile phones, tablets, TVs and PCs, etc. to the current electronic devices, such as smart wearable devices and virtual reality (VR).

To meet people's demand for the stereoscopic display of display devices, the 3D holographic display has become a major development direction in the current display field. The 3D holographic display device needs to form a left-eye image and a right-eye image from the incident light through a grating to facilitate the 3D holographic display.

In the existing gratings, the same grating electrode usually corresponds to multiple supporting pillars. When the number of supporting pillars corresponding to the same grating electrode is large, the supporting pillars may crush the grating electrode. When both ends of the same grating electrode are crushed, its electrical connection with the external driving unit will be completely disconnected, causing the grating electrode to fail to work, and the normal display are affected.

Therefore, there is need to reduce the possibility of the crushing of the supporting pillars and improve the display reliability of the 3D holographic display device. The disclosed gratings and display devices are directed to solve one or more problems set forth above and other problems in the art.

SUMMARY

One aspect of the present disclosure provides a grating. The grating may include a first substrate and a second substrate disposed opposite to the first substrate; and a plurality of grating electrodes and a plurality of spacing pillars disposed between the first substrate and the second substrate. The plurality of grating electrodes extend along a first direction and are arranged along a second direction; along a plane parallel to the first substrate, positions of the plurality of spacing pillars are referred to as a plurality of matrix points; the plurality of spacing pillars correspond to the plurality of matrix points; the plurality of matrix points include multiple first matrix point units; along the plane parallel to the first substrate, the plurality of matrix point units are arranged as an array; a minimum repeating unit of the plurality matrix points includes four first matrix point units of the multiple first matrix point units; the four matrix point units are located at four vertexes of a first quadrilateral; two adjacent sides of the first quadrilateral are defined as a first unit vector and a second unit vector, respectively; an angle between the first unit vector and the second unit vector is $\alpha 1$, and $0° \le \alpha 1 \le 90°$; an angle between the first unit vector and the first direction is $\beta 1$, and $\beta 1 \ne 0°$, and $\beta 1 \ne 180°$; and an angle between the second unit vector and the first direction is $\gamma 1$, and $\gamma 1 \ne 0°$, and $\gamma 1 \ne 180°$.

Another aspect of the present disclosure provides a grating. The grating may include a first substrate and a second substrate disposed opposite to the first substrate; and a plurality of grating electrodes and a plurality of spacing pillars disposed between the first substrate and the second substrate. The plurality of grating electrodes extend along a first direction, and are arranged along a second direction; the first direction intersects the second direction; along a plane parallel to the first substrate, positions of the plurality of spacing pillars are referred to as matrix points; the plurality of spacing pillars corresponds to a plurality of first matrix points; the plurality of first matrix points are divided into a plurality of repeating units; each repeating unit includes at least three of the plurality of matrix points; a repeating unit corresponding to a shape having a minimum perimeter and area is a first matrix group; and an extension direction of a connection line of any two first matrix points in the first matrix group is different from the first direction.

Another aspect of the present disclosure provides a 3D holographic display device. The 3D holographic display device may include a light source device, configured to emit coherent RGB three-color light in a time sequence; a beam expanding collimating component, configured to perform a beam expanding and collimating processing on the light emitted by the light source device; a spatial light modulator, configured to sequentially perform a phase modulation and a amplitude modulation on light emitted by the beam expanding collimator component; a field lens, configured at least to improve an ability of an edge light of the light emitted by the spatial light modulator to enter a grating; and the grating, configured to form a left-eye image and a right-eye image based on the incident light image. The grating may include a present disclosed grating.

Other aspects of the present disclosure can be understood by those skilled in the art in light of the description, the claims, and the drawings of the present disclosure.

BRIEF DESCRIPTION OF THE DRAWINGS

The drawings incorporated in the specification and constituting a part of the specification illustrate the embodiments of the present disclosure, and together with the description are used to explain the principle of the present disclosure.

DETAILED DESCRIPTION

Figure 1:
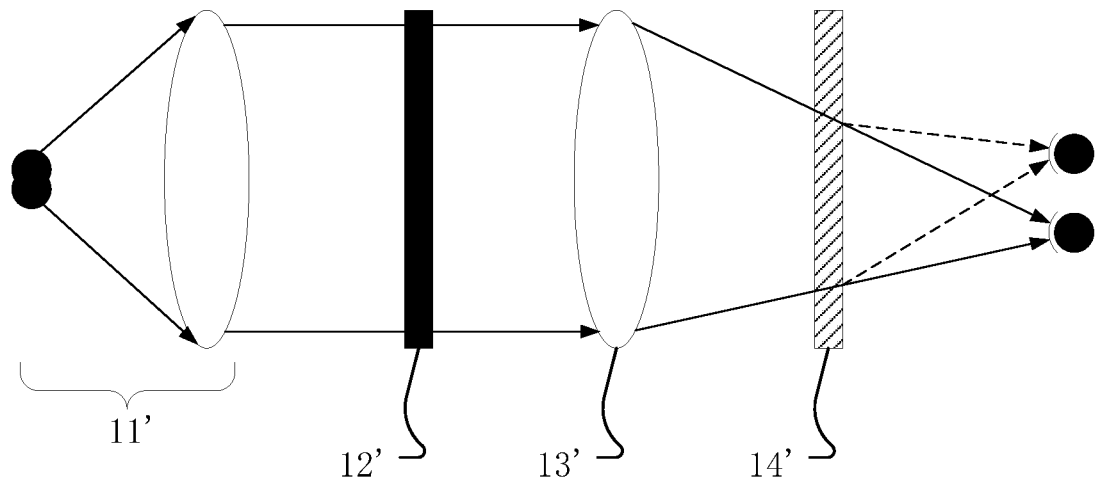
FIG. 1 illustrates a conventional 3D holographic display device.

Various exemplary embodiments of the present disclosure will now be described in detail with reference to the accompanying drawings. It should be noted that unless specifically stated otherwise, the relative arrangement of components and steps, numerical expressions and numerical values set forth in these embodiments do not limit the scope of the present disclosure.

The following description of at least one exemplary embodiment is actually only illustrative, and in no way serves as any limitation to the present disclosure and its application or use.

The technologies, methods, and equipment known to those of ordinary skill in the relevant fields may not be discussed in detail, but where appropriate, the technologies, methods, and equipment should be regarded as part of the specification.

In all examples shown and discussed herein, any specific value should be interpreted as merely exemplary, rather than as a limitation. Therefore, other examples of the exemplary embodiment may have different values.

It should be noted that similar reference numerals and letters indicate similar items in the following drawings, so once an item is defined in one drawing, it does not need to be further discussed in the subsequent drawings.

The conventional stereoscopic 3D display principle is the binocular parallax type, the left eye and the right eye each sees a different two-dimensional image, and the 3D experience is formed through the binocular parallax. The 3D holographic display principle is a three-dimensional spatial display, and the observer can focus on the object individually at any depth. The 3D holographic display can be realized based on the device shown in FIG. 1.

FIG. 1 is a schematic structural diagram of a conventional 3D holographic display device. The 3D holographic display device includes a backlight 11', a spatial light modulator 12', a field lens 13', and a grating 14'. The backlight source 11' includes a light source device and a beam expanding collimating component for emitting coherent RGB three-color light in time series. The spatial light modulator 12' is used to modulate the amplitude and phase of the light, and the grating 14' adjusts the deflection angle of the light adjusted by the spatial light modulator 12', and injects different light into the eyes, thereby realizing a large-angle holographic display. It can be seen that gratings play a vital role in the 3D holographic display device.

Figure 2:
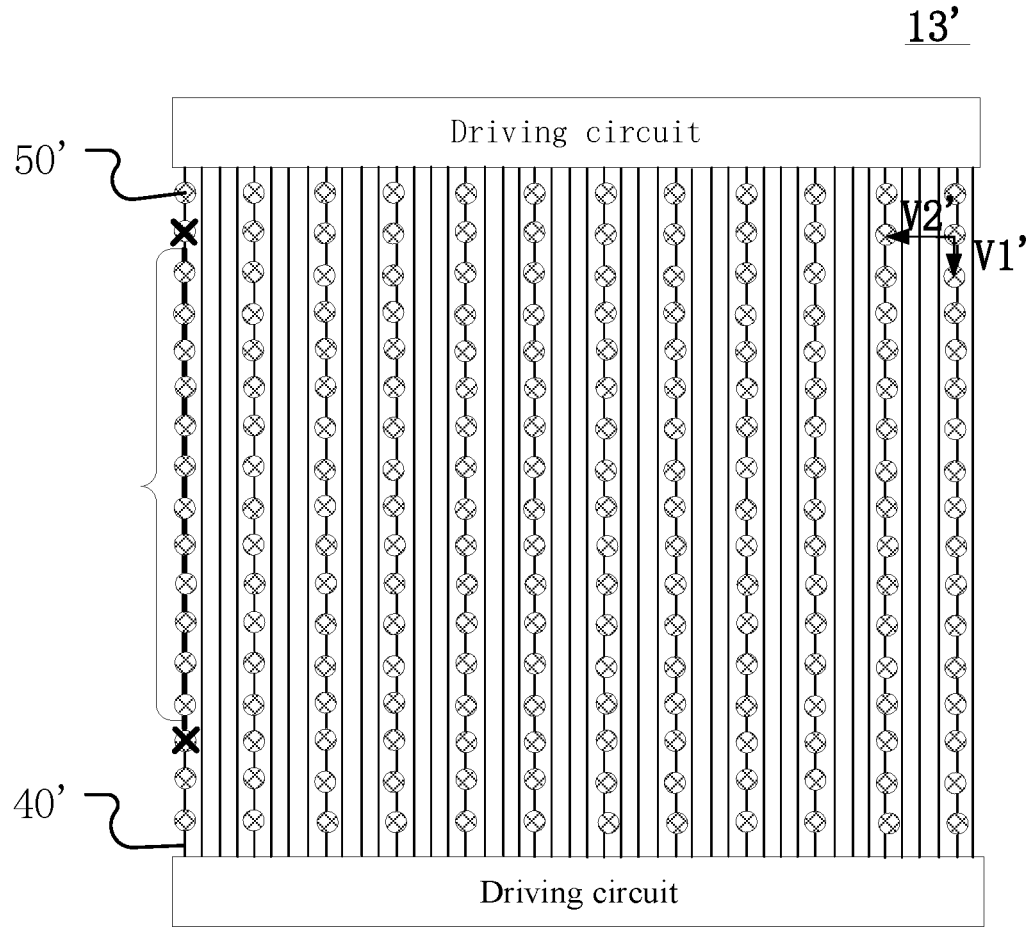
FIG. 2 illustrates the relative positional relationship of the grating electrodes, the supporting pillars and the driving units in a common grating.

FIG. 2 is a schematic diagram of the relative positions of the grating electrodes 40', the supporting pillars 50' and the driving circuits in the conventional grating. Each grating electrode 40' is generally designed to be driven simultaneously from both sides. For example, both ends of the same grating electrode 40' are respectively connected to two independent driving circuits, and the two independent driving circuits respectively apply the same driving signal to the same grating electrode 40', thereby improving the response speed. The grating 12' also includes a plurality of supporting pillars 50'. When the same grating electrode overlaps the plurality of supporting pillars, the number of supporting pillars 50' corresponding to the same grating electrode 40' can reach hundreds or even several hundreds (FIG. 2 illustrates the relative positional relationship between the grating electrodes 40' and the supporting pillar 50', and does not represent the actual number of the supporting pillars 50' corresponding to each grating electrode 40'), when a grating electrode overlaps with so many supporting pillars, the grating electrode is more likely to be crushed. When both ends of the same grating electrode 40' are crushed, for example, when the grating electrode 40' in the region corresponding to "x" in FIG. 2 is crushed, the line segment of the grating electrode 40 shown in the braces in FIG. 2 (indicated by thickening the line segment) and the electrical connection of the drive circuit will be completely disconnected and unable to work, and the normal display are adversely affected. Further, because the grating electrode 40' is elongated, it is prone to breakage under pressure. When the number of supporting pillars corresponding to the elongated grating electrode 40' is large, the risk of the grating electrode being crushed is further increased.

Figure 3:
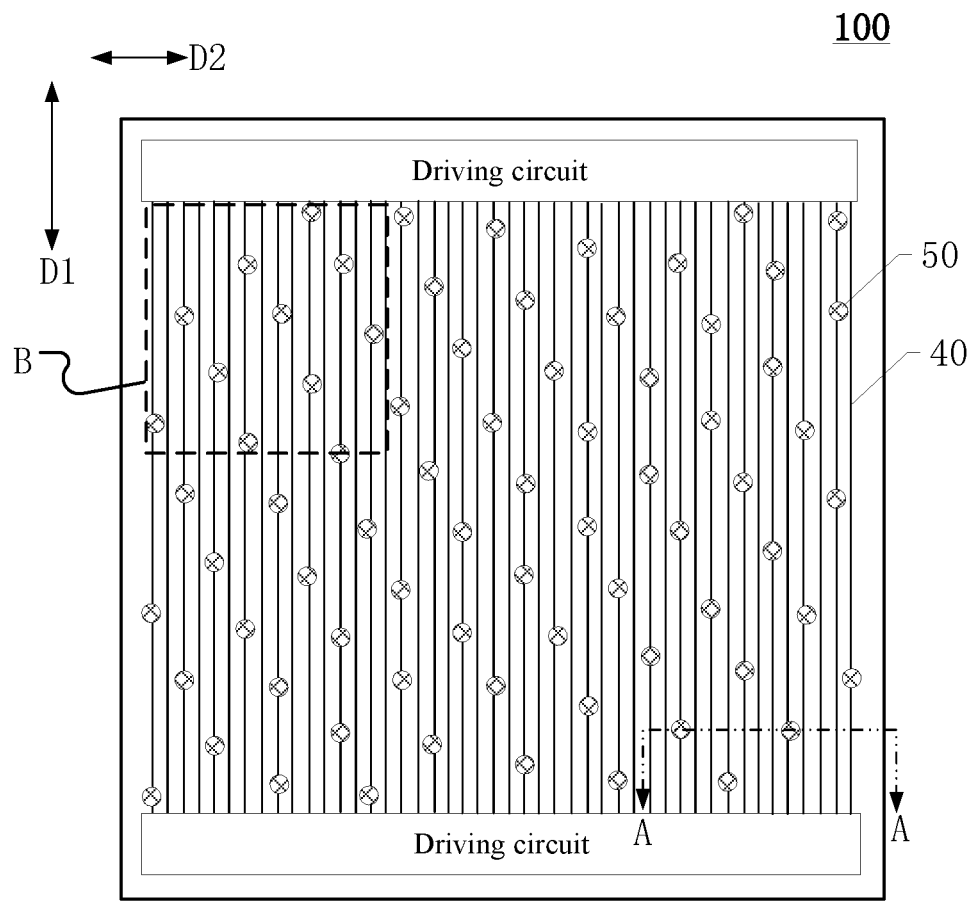
FIG. 3 illustrates a top view of an exemplary grating consistent with various disclosed embodiments of the present disclosure.
Figure 4:
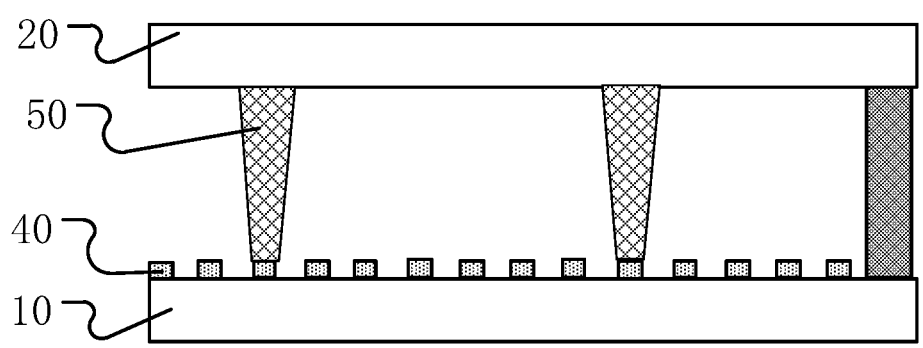
FIG. 4 illustrates an AA-sectional view of the grating in FIG. 3.
Figure 5:
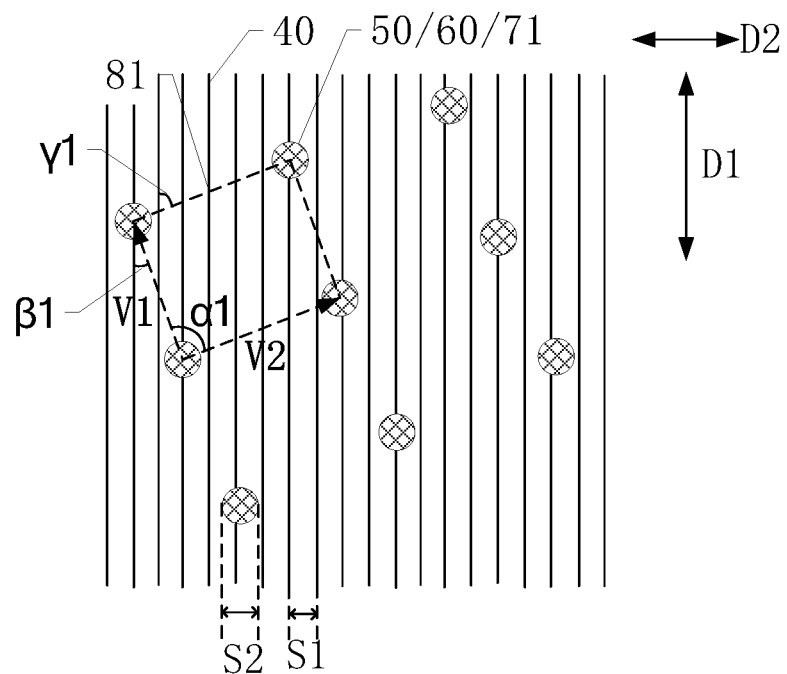
FIG. 5 illustrates a zoomed-in view of the region B in FIG. 3.

The present disclosure provides a grating and a 3D holographic display device. FIG. 3 illustrates a top view of an exemplary grating consistent with various disclosed embodiments of the present disclosure, and FIG. 4 shows an AA-sectional view of the grating in FIG. 3. FIG. 5 is a partially enlarged schematic diagram of the area B in FIG. 3.

As shown in FIGS. 3-5, the grating 100 may include a first substrate 10 and a second substrate 20 arranged opposite to each other, and a plurality of grating electrodes 40 and a plurality of spacing pillars 50 disposed between the first substrate 10 and the second substrate 20. Each grating electrode 40 may extend along a first direction D1, and the plurality of grating electrodes 40 may be arranged along a second direction D2.

On a plane parallel to the first substrate 10, the positions where the spacing pillars 50 are located may be referred to as matrix points 60.

The plurality of spacing pillars 50 may correspond to the plurality of matrix points 60. The plurality of matrix points 60 may include a plurality of first matrix point units 71. On a plane parallel to the first substrate 10, the plurality of first matrix point units 71 may be arranged as an array, and the smallest repeating unit of the array may include four matrix point units 71, and the four first matrix point units 71 may be located at the four vertices of a first quadrilateral 81. The two adjacent sides of the first quadrilateral 81 may be respectively defined as a first unit vector V1 and a second unit vector V2. The angle between the first unit vector V1 and the second unit vector V2 may be referred to as α1, and 0°<α1≤90°.

The angle between the first unit vector V1 and the first direction D1 may be referred to as β1, and β1≠0° and β1≠180°. The angle between the second unit vector V2 and the first direction D1 may be referred to as γ1, and γ1≠0° and γ1≠180°.

It should be noted that the matrix points mentioned in the embodiment of the present disclosure may correspond to the spacing pillars on a one-to-one basis. The matrix points may be understood as the area corresponding to the orthographic projection of the spacing pillars 50 on the light-exiting surface of the grating, which has a certain area, such as the circular areas shown in FIG. 3 and FIG. 5. In the drawings of the present disclosure, only the orthographic projection of the spacing pillars 50 on the light-exiting surface of the grating is illustrated as an example. In some other embodiments of the present disclosure, the orthographic projection of the spacing pillars 50 on the light-exiting surface of the grating may also be embodied as other shapes, such as triangles, squares, pentagons, hexagons, etc., considering the support performance of the spacing pillars, the orthographic projection of the spacing pillars on the light-exiting surface of the grating may be set to a regular polygon.

In one embodiment, referring to FIG. 3 and FIG. 5, the grating provided by the embodiment of the present disclosure may include multiple repeating unit selection methods. The minimum repeating unit may refer to the repeating unit with both the smallest length of the first unit vector of the quadrilateral and the smallest length of the second unit vector of the quadrilateral.

The first quadrilateral may be a first parallelogram, and the parallelogram may include general parallelograms and special parallelograms. The special parallelograms may include rectangles, rhombuses, and squares.

Further, it should be noted that when matching the spacing pillars in the grating with the parallelogram, the process error may be taken as a factor to be considered. For example, if the distance between the position of the spacer and the apex of the quadrilateral is within the process error range, it can be considered that the positions of the spacing pillars correspond to the quadrilateral.

FIG. 3 only uses a rectangular grating 100 as an example to illustrate the grating 100 of the present disclosure. In some other embodiments of the present disclosure, the grating 100 may also be embodied in other shapes, such as a circle, an ellipse, a rounded rectangle, or other possible shapes. FIG. 4 only shows a relative positional relationship of the first substrate 10, the second substrate 20, the grating electrode 40, and the spacing pillars 50, and does not limit the actual thickness of each film layer. FIG. 5 only illustrates the positional relationship between the grating electrode 40 and the spacing pillars 50 in the region B of the grating 100. The positional relationship of the grating electrode 40 and the spacing pillars 50 in other regions may be referred to FIG. 5. FIG. 5 may not limit the actual size of the electrodes 40 and the spacing pillars 50.

Referring to FIGS. 3-5, the grating 100 provided by the embodiment of the present disclosure may include a first substrate 10 and a second substrate 20 disposed opposite to each other, and a plurality of grating electrodes 40 and a plurality of spacing pillars 50 disposed between the first substrate 10 and the second substrate 20. The plurality of spacing pillars 50 may support the first substrate 10 and the second substrate 20, and prevent the first substrate 10 and the second substrate 20 from deforming under the action of an external force.

The positions of the spacing pillars 50 in the present disclosure may be referred to as matrix points 60. The plurality of matrix points 60 may include a plurality of first matrix point units 71 arranged in an array, and the smallest repeating unit of the plurality of first matrix point units 71 may include four first matrix point units 71, the four first matrix point units 71 may be located at the four vertices of the first quadrilateral 81. The two adjacent sides of the first quadrilateral 81 may be defined as the first unit vector V1 and the second unit vector V2.

In the present disclosure, the first unit vector V1 and the second unit vector V2 may not be parallel to the extension direction of the grating electrode 40 (i.e., the first direction D1). For example, the angle β1 between the first unit vector V1 and the first direction D1 may satisfy: β1≠0° and β1≠180°; the angle γ1 between the second unit vector V2 and the first direction D1 may satisfy: γ1≠0°, γ1≠180°. The angle between the first unit vector V1 and the second unit vector V2 may be referred to as α1, and 0°<α1≤90°. Such a configuration may effectively prevent the spacing pillars 50 between two first matrix point units 71 corresponding to the first unit vector V1 from being concentrated on the same grating electrode 40; and may also effectively avoid the situation that the spacing pillars 50 in the two first matrix point units 71 corresponding to the second unit vector V2 are concentrated on the same grating electrode 40. Thus, the number of spacing pillars 50 corresponding to the same electrode 40 may be greatly reduced. Accordingly, the risk of the grating electrode 40 being crushed by the spacing pillars 50 may be significantly reduced, and at the same time, and the possibility that both ends of the same grating electrode 40 are crushed by the spacing pillars 50 at the same time may be reduced. Thus, the reliability of the transmission of the driving signal by the grating electrode 40 may be improved, and thus the reliability of the use of the grating 100 may be improved.

Further, in the grating provided by the embodiment of the present disclosure, the first matrix point units 71 may be arranged in an array and may constitute a plurality of minimum repeating units. For example, the first matrix point units in the present disclosure may not be randomly arranged. Instead, the array is arranged to form multiple minimum repeating units, which is a regular arrangement. Under such a configuration, when the first matrix units are formed in the grating, they be made in an uniform arrangement. Thus, the method that the first matrix point units are arranged regularly may facilitate to simplify the design of the grating, and at the same time, the uniformity of the arrangement of the first matrix point units may be improved.

Figure 6:
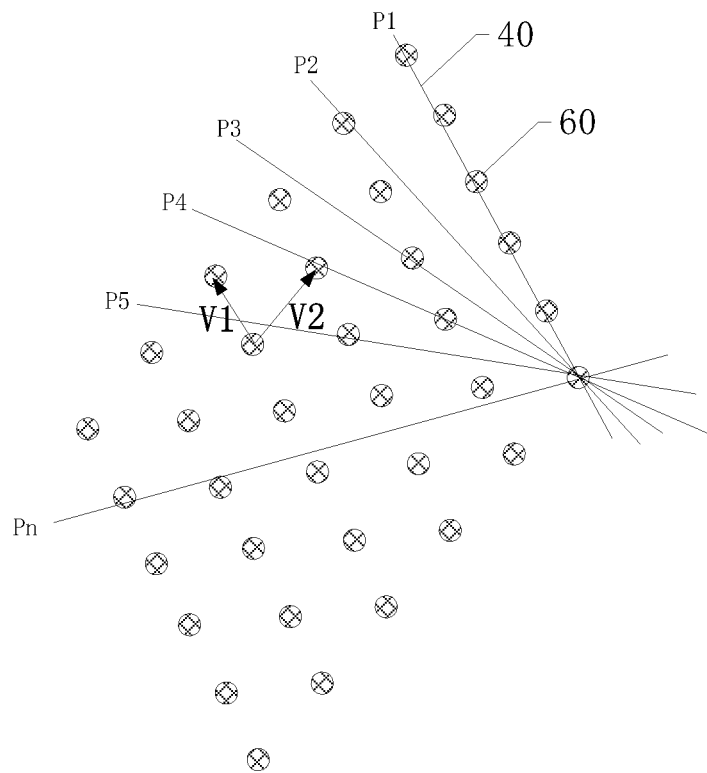
FIG. 6 illustrates a positional relationship between the grating electrodes and the matrix points.

The content of the present disclosure will be further described below in conjunction with FIG. 6. FIG. 6 shows the relative positional relationship between the grating electrodes and the matrix points.

As shown in FIG. 6, P1-Pn represent the different setting directions and positions of the grating electrodes 40. When a grating electrode 40 is at the position P1, its extension direction may be same as the extension direction of the first unit vector V1. At this time, the number of matrix points overlapping the grating electrode 40 may be the largest. Among the matrix points 60 corresponding to the same grating electrode 40, the distance between two adjacent matrix points may be the smallest. When the extension direction of the grating electrode 40 changes and becomes different from the extension direction of the first unit vector V1, for example, corresponding to the grating electrodes at the positions P2-Pn in FIG. 6. Under such a configuration, the number of the matrix points corresponding to a same grating electrode may be reduced. Correspondingly, among the multiple matrix points corresponding to the same grating electrode, the distance between two adjacent matrix points becomes larger. Similarly, when the extending direction of the grating electrode 40 and the extending direction of the second unit vector V2 are set to be the same, the number of matrix points corresponding to the same grating electrode may also be larger. If the extension direction of the grating electrode 40 is different from that of the second unit vector V2, it may also facilitate to reduce the number of matrix points corresponding to the same grating electrode.

Therefore, in the present disclosure, the extension direction of the first unit vector V1 and the second unit vector V2 may be set to be different from the extension direction of the grating electrode (i.e., the first direction), it may facilitate to reduce the number of spacing pillars corresponding to each grating electrode. By dispersing the spacing pillars to the positions of different grating electrodes, the number of spacing pillars corresponding to the same grating electrode may be reduced to a few tens or even just over ten. Comparing with the same grating electrode corresponds to hundreds of grating electrodes, the reduction may be several magnitudes. Thus, the risk of the grating electrode being crushed by the spacing pillars may be significantly reduced.

It should be noted that FIG. 5 only shows that the same first matrix point unit 71 includes one matrix point 60, that is, corresponds to one spacing pillar 50. In some other embodiments of the present disclosure, the same first matrix point unit 71 may include two or more matrix points 60. The solution for the same first lattice point unit 71 including two or more matrix points 60 will be described in subsequent embodiments.

When the grating has a rectangular structure as shown in FIG. 3, FIG. 3 only takes that the extension direction of the grating electrode 40 is the same as the extension direction of the long side of the grating as an example. In some other embodiments of the present disclosure, the extension direction may also be different from the extension direction of the long side of the grating.

Figure 7:
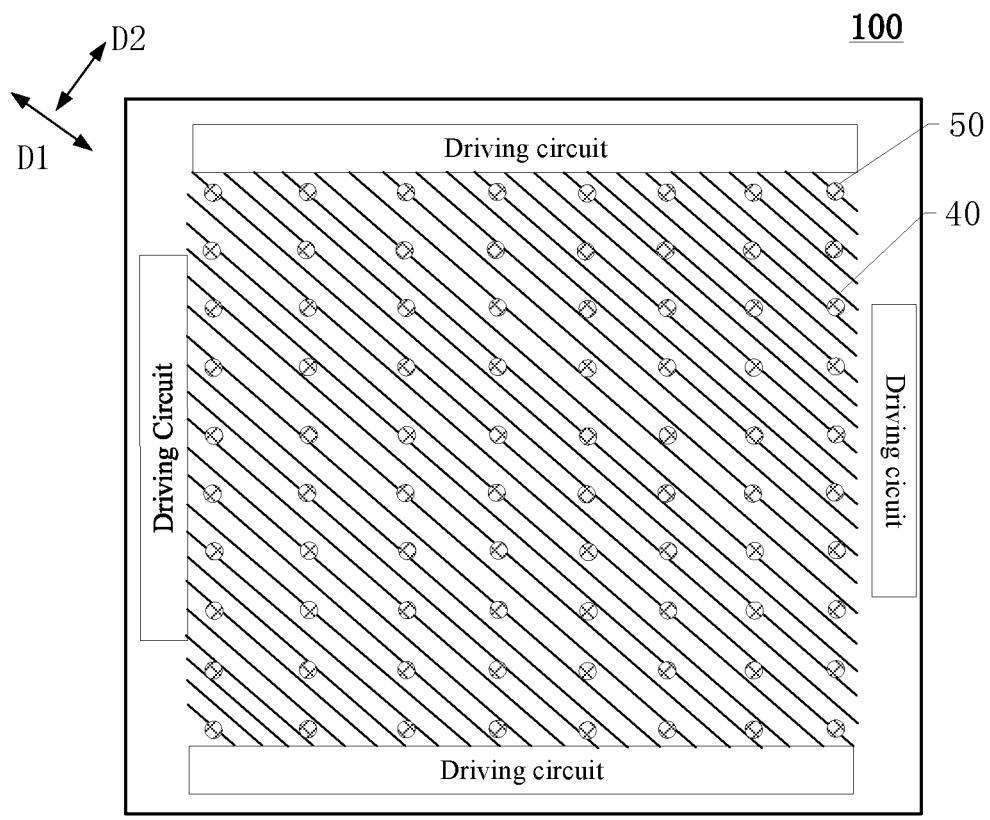
FIG. 7 illustrates another top view of an exemplary grating consistent with various disclosed embodiments of the present disclosure.

FIG. 7 illustrates another top view of an exemplary grating consistent with various disclosed embodiments of the present disclosure. As shown in FIG. 7, in this embodiment, the extension direction of the grating electrode 40 may intersect both the extension directions of the long and short sides of the grating, and the driving circuit may be distributed in the four bezel areas of the grating. The design idea of the present disclosure may also be applicable to the grating structure shown in FIG. 7. In the manner shown in FIG. 7, the extension direction of the first unit vector may be the same as or different from the direction of the long side or the short side of the grating.

In one embodiment, the first direction D1 may not be parallel to the direction of the diagonal of the first quadrilateral 81.

Figure 8:
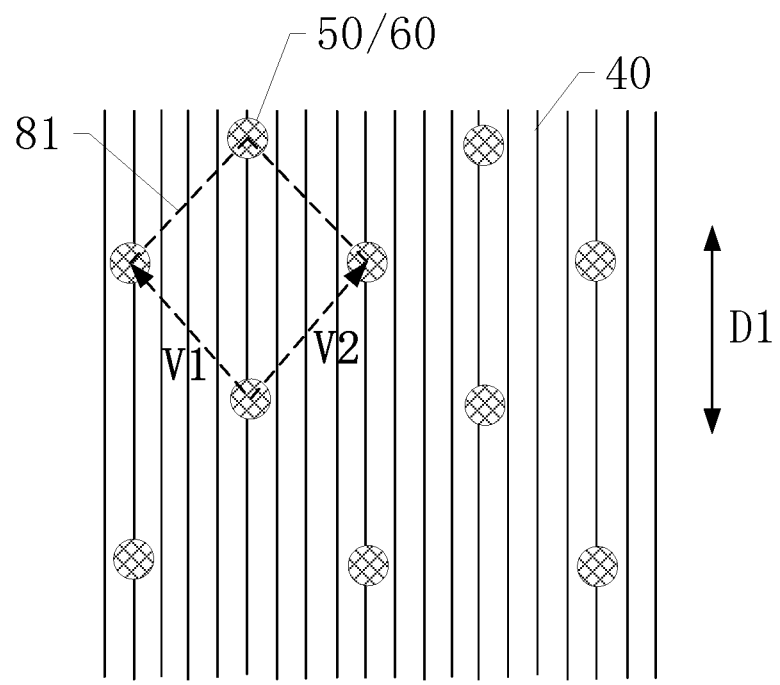
FIG. 8 illustrates a positional relationship between the grating electrode and a first matrix unit when the diagonal of the first quadrilateral is parallel to a first direction.

For example, when the direction of a diagonal line of the first quadrilateral 81 is parallel to the first direction D1, the situation that the spacing pillars 50 of the two first matrix point units 71 on the diagonal line are disposed on a same grating electrode 40 at the same time may occur, as shown in FIG. 8. FIG. 8 illustrates a relationship between the grating electrodes 40 and the first matrix point units 71 when the diagonal of the first quadrilateral 81 is parallel to the first direction D1. When the diagonal line of the first quadrilateral 81 is parallel to the first direction D1, the two matrix points 60 corresponding to the diagonal line may be located on the same grating electrode 40. Thus, it may be possible to increase the number of spacing pillars 50 corresponding to the same grating electrode 40. When the diagonal of the first quadrilateral 81 is set to be non-parallel to the first direction D1, for example, as shown in FIG. 5, it may be possible that the spacing pillars 50 corresponding to the four first matrix point units 71 corresponding to the first quadrilateral 81 are respectively distributed on different grating electrodes 40. Thus, it may be more beneficial to reduce the number of the spacing pillars 50 corresponding to the same grating electrode 40 in the grating 100, and thus more beneficial to reduce the possibility that both ends of the grating electrode 40 are crushed by the spacing pillars 50 at the same time.

In one embodiment of the present disclosure, $45° \leq \alpha 1 \leq 90°$.

For example, in the present disclosure, when the angle between the first unit vector V1 and the second unit vector V2 is set to be less than 45° or greater than 90°, the difference in length between the two diagonals of the first quadrilateral 81 may be relatively large, the distance difference between the two sets of first matrix point units 71 corresponding to the two diagonal lines may be relatively large, and the distribution uniformity of the spacing pillars 50 corresponding to the matrix points 60 may be affected. When the angle between the first unit vector V1 and the second unit vector V2 is set in the range of approximately 45°-90°, it may be beneficial to reduce the difference in length between the two diagonal lines of the first quadrilateral 81, and furthermore, it may be beneficial to reduce the distance difference between the two sets of first matrix point units 71 corresponding to the two diagonal lines, and thus it may be beneficial to improve the distribution uniformity of the spacing pillars 50 in the grating 100 to improve the uniformity of the supporting force received in different areas of the first substrate 10 and the second substrate 10. The angle α1 between the first unit vector V1 and the second unit vector V2 may be 50°, 60°, 70°, 75°, or 80°, etc.

In one embodiment of the present disclosure, $60° \leq \alpha 1 \leq 90°$. When the angle between the first unit vector V1 and the second unit vector V2 is set to be greater than or equal to 60°, it may be beneficial to further reduce the length difference between the two diagonals of the first quadrilateral 81, and thus it may be more beneficial to improve the distribution uniformity of the spacing pillars 50 in the grating 100.

In one embodiment of the present disclosure, $10° \leq \beta 1 \leq 80°$, $10° \leq \gamma 1 \leq 80°$.

For example, referring to FIG. 5, because the spacing pillars 50 corresponding to the matrix points 60 in the first matrix point unit 71 may have a certain size, not a just point, when the angle β1 between the first unit vector V1 and the first direction D1 is less than 10° or greater than 80°, the two first matrix point units 71 corresponding to the first unit vector V1 may overlap along the first direction D1, and the condition that two spacing pillars 50 in the two first matrix point unit 71 corresponding to the first unit vector V1 may be located on the same grating electrode 40 may occur, which may not facilitate to reduce the number of spacing pillars 50 corresponding to the same grating electrode 40. Similarly, when the angle γ1 between the second unit vector V2 and the first direction D1 is less than 10° or greater than 80°, the two first matrix point units 71 corresponding to the second unit vector V2 may overlap along the first direction D1. There may be two spacing pillars 50 in the two first matrix point units 71 corresponding to the second unit vector V2 that are located on the same grating electrode 40, which may also not be conducive to reducing the number of spacing pillars 50 corresponding to the same grating electrode 40.

In the present disclosure, the angle β1 between the first unit vector V1 and the first direction D1 and the angle γ1 between the second unit vector V2 and the first direction D1 may be set as: $10° \leq β1 \leq 80°$, and $10° \leq γ1 \leq 80°$. Such a configuration may effectively avoid the situation that the spacing pillars 50 in the two first matrix point units 71 corresponding to the first unit vector V1 are located on the same grating electrode 40, and at the same time, it may also effectively avoid the situation that the spacing pillars 50 in two matrix point units 71 corresponding to the second unit vector V2 are located on the same grating electrode 40. Thus, it may be more conducive to reducing the number of spacing pillars 50 corresponding to the same grating electrode 40, and reducing the possibility that the two ends of the grating electrode 40 are simultaneously crushed by the spacing pillars 50. Accordingly, the reliability of the transmission of the driving signal in the grating electrode 40 may be improved.

In another embodiment, the angle β1 between the first unit vector V1 and the first direction D1 and the angle γ1 between the second unit vector V2 and the first direction D1 may also be set to $30° \leq β1 \leq 60°$, $30° \leq γ1 \leq 60°$, or $40° \leq β1 \leq 50°$, $40° \leq γ1 \leq 50°$, or $45° \leq β1 \leq 75°$, or $45° \leq γ1 \leq 75°$, etc. For example, the angle β1 between the first unit vector V1 and the first direction D1 may be 35°, 48°, or 55°, etc., and the angle γ1 between the second unit vector V2 and the first direction D1 may be set as 35°, 48°, or 55°, etc.

Figure 9:
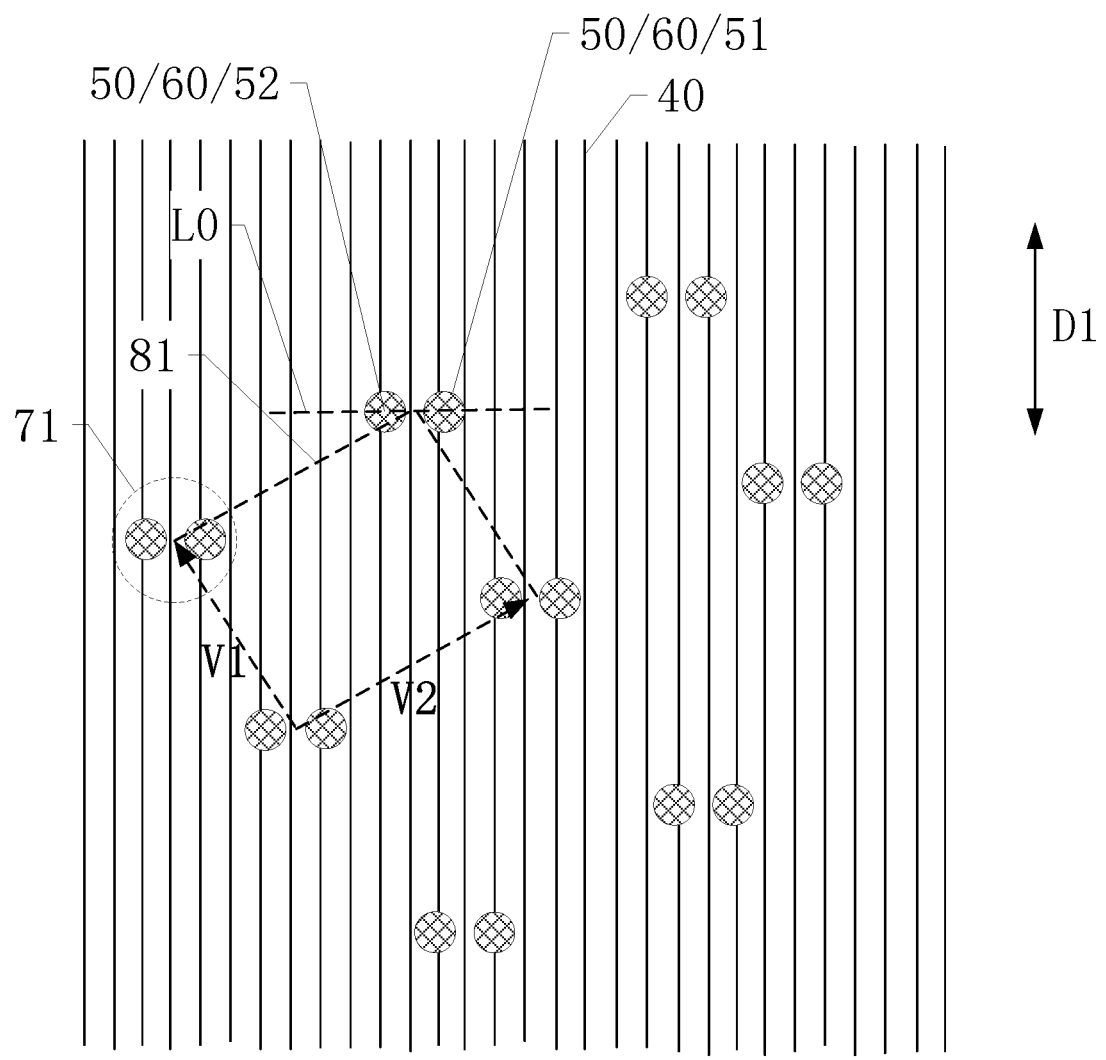
FIG. 9 illustrates another zoomed-in view of the region B in FIG. 3.
Figure 10:
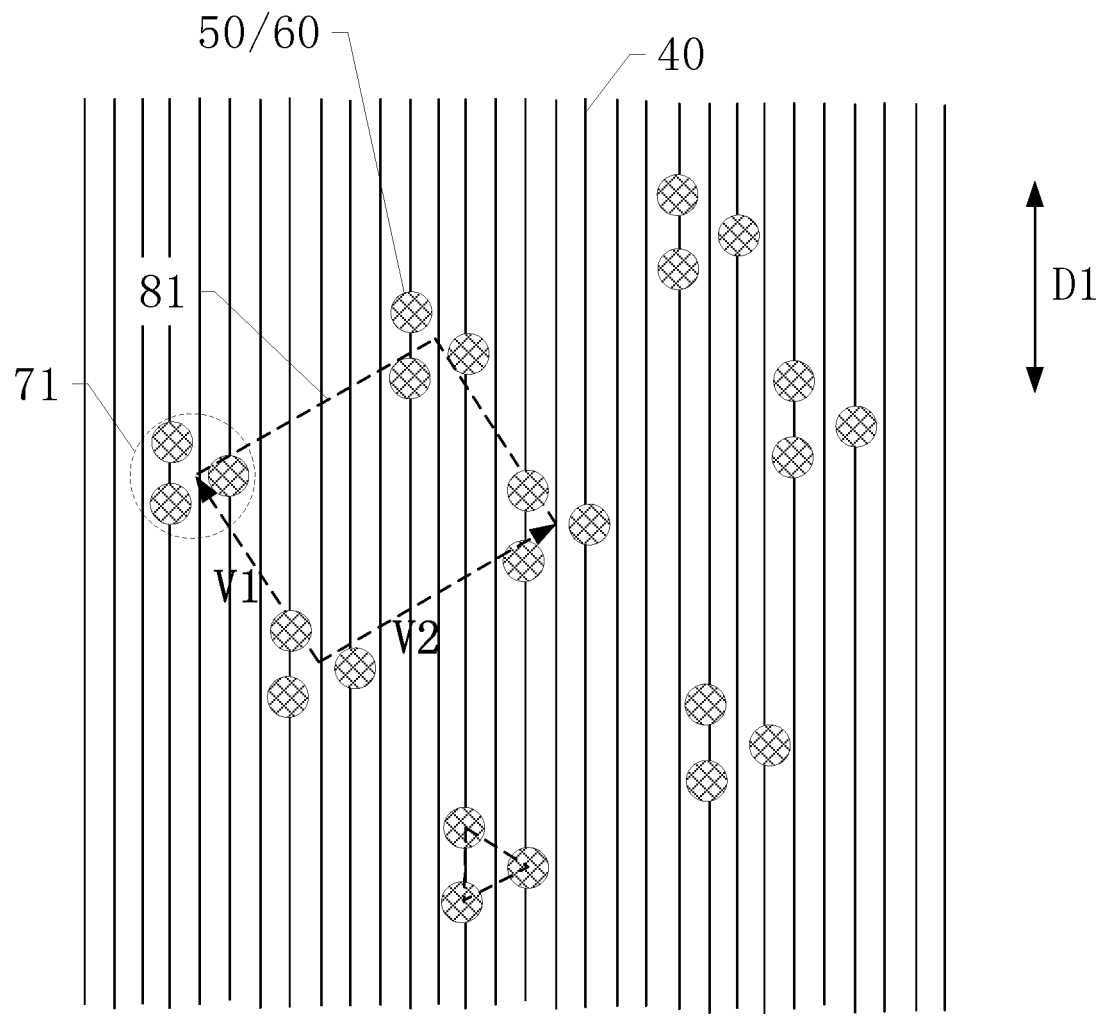
FIG. 10 illustrates another zoomed-in view of the region B in FIG. 3.

FIG. 9 and FIG. 10 respectively illustrate another exemplary partially enlarged schematic diagram of the region B in FIG. 3. As shown in FIGS. 9-10, in another embodiment of the present disclosure, the first matrix point unit 71 may include at least two matrix points 60. In the same first matrix point unit 71, among the straight lines connecting any two matrix points 60, the extension direction of at least one of the straight lines may intersect the first direction D1.

For example, FIG. 9 shows a situation where a first matrix point unit 71 may include two matrix points 60. As shown in FIG. 9, the connection line LO of the two matrix points 60 in the same first lattice point unit 71 may intersect the first direction D1 intersects. Such a configuration may effectively avoid the phenomenon that the two matrix points 60 in the same first matrix point unit 71 are located on the same grating electrode 40. Thus, it may facilitate to reduce the number of spacing pillars 50 corresponding to the same grating electrode 40, and thus the possibility that both ends of the same grating electrode 40 are crushed by the spacing pillars 50 at the same time may be avoided. When a first matrix point unit 71 includes two matrix points 60, the angle between the extending direction of the straight line connecting the two matrix points 60 and the first direction D1 may be, for example, greater than 0° and less than or equal to 90°, or may be greater than or equal to 10° and less than or equal to 90° to avoid overlapping of the two matrix points 60 along the first direction D1. Thus, it may facilitate to avoid the two matrix points 60 being located on the same grating electrode 40.

It should be noted that when the same first matrix unit includes two or more matrix points, the center of the pattern formed by multiple matrix points in the first matrix point unit may be taken as the vertex of the first quadrilateral. For example, when the same first matrix point unit includes two matrix points, the midpoint of the line connecting the centers of the two matrix points may be used as the vertices of the first quadrilateral.

FIG. 10 illustrates a situation where a first matrix point unit 71 includes three matrix points 60. As shown in FIG. 10, in the connection line of any two matrix points 60 in the same first matrix point unit 71, the extension directions of two of the three straight lines may all intersect the first direction D1, and only the extension direction of one straight line may be parallel to the first direction D1. Thus, only two of the three matrix points 60 of the same first matrix point unit 71 may be located on the same grating electrode 40, and the situation where three matrix points 60 are located on the same grating electrode 40 at the same time may be avoided. Accordingly, it may also be beneficial to reduce the number of matrix points 60 corresponding to the same grating electrode 40 to reduce crushing possibility of the grating electrode 40 being by the spacing pillars 50. It should be noted that when the extension direction of the straight line connecting the two matrix points 60 in the same matrix point unit 71 is not parallel to the first direction D1, the angle between the line and the first direction D1 may be selected to be greater than or equal to 10° and less than or equal to 90° to avoid overlapping of the two matrix points 60 on the straight line along the first direction D1, which may be more beneficial to avoid the possibility that the two matrix points 60 are located on the same grating electrode 40.

Figure 11:
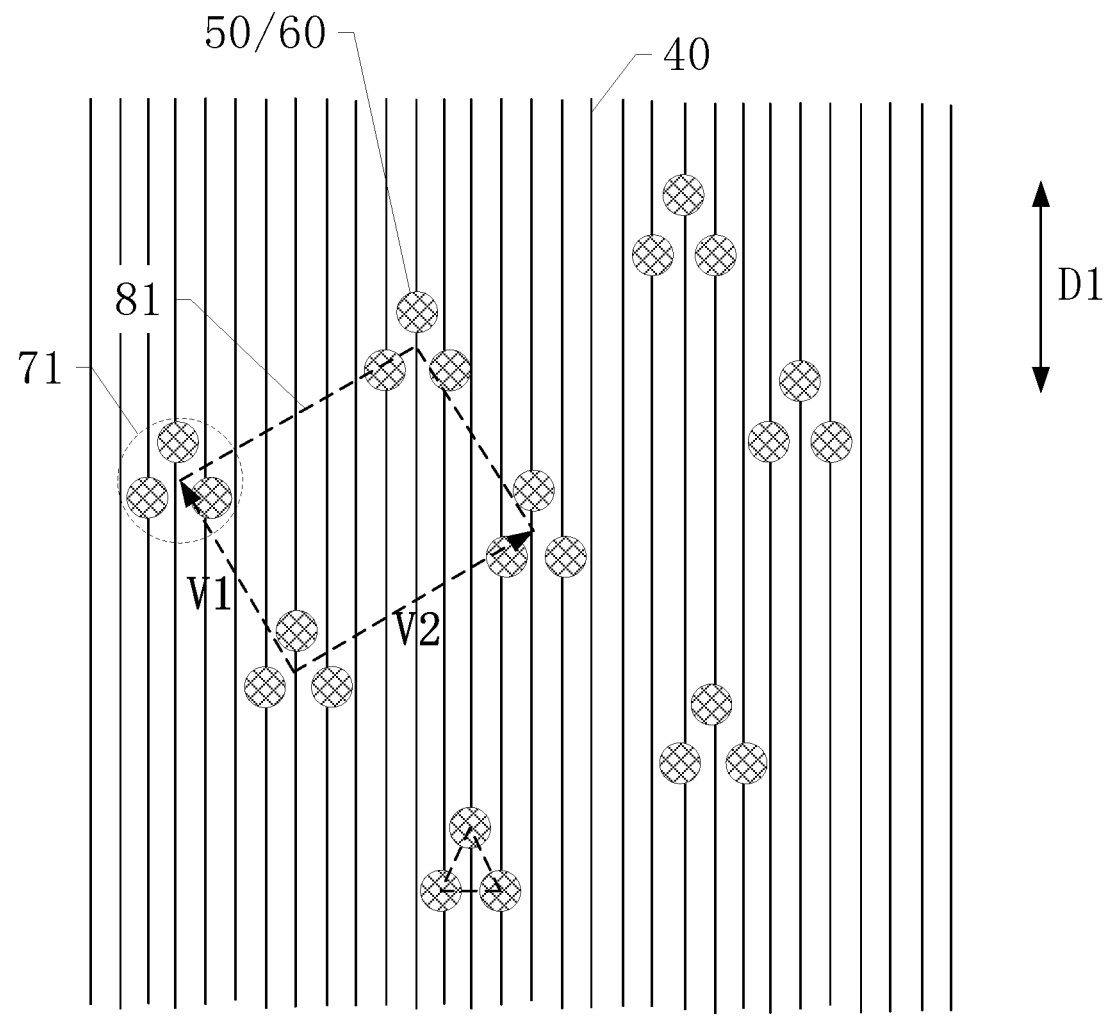
FIG. 11 illustrates another zoomed-in view of the region B in FIG. 3.
Figure 12:
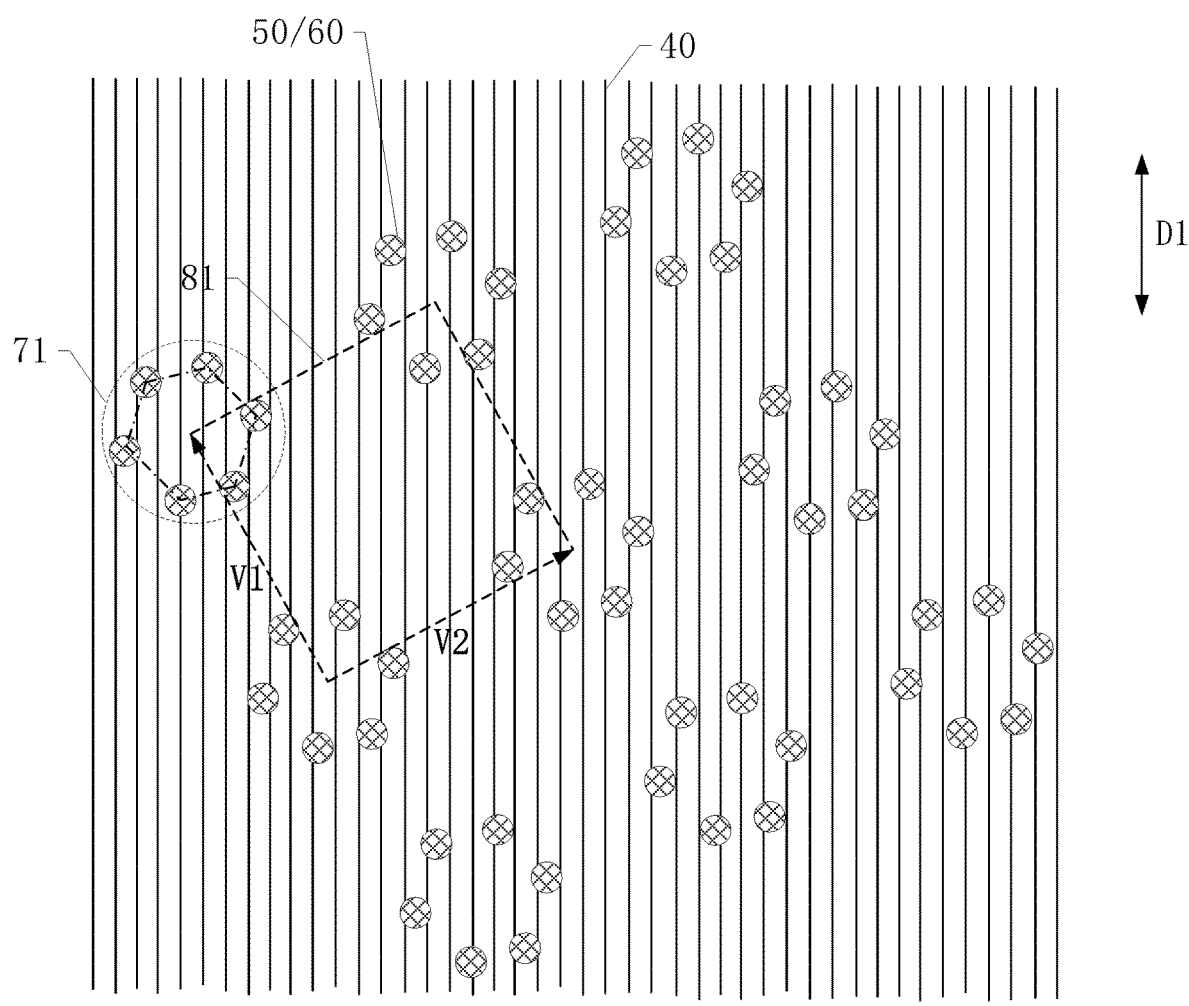
FIG. 12 illustrates another zoomed-in view of the region B in FIG. 3.

FIGS. 11-12 respectively illustrate another partially enlarged schematic diagram of the area B in FIG. 3. As shown in FIGS. 11-12, in some embodiments of the present disclosure, in the same first lattice point unit 71, the extension directions of the straight lines connecting any two matrix points 60 may intersect the first direction D1.

For example, FIG. 11 shows a scheme in which the same first matrix point unit 71 may include three lattice points 60 and the extension direction of a straight line connecting any two matrix points 60 may intersect the first direction D1, and FIG. 12 shows the scheme in which the same first matrix point unit 71 may include six matrix points 60 and the extension direction of the straight line connecting any two matrix points 60 may intersect the first direction D1. When the extension of each straight line connecting any two matrix points 60 all intersects with the first direction D1, the possibility of any two matrix points 60 overlapping along the first direction D1 may be greatly reduced, thereby greatly reducing the possibility that the two matrix points 60 are located on the same grating electrode 40. Thus, it may be more beneficial to reduce the number of spacing pillars 50 corresponding to the same grating electrode 40, and reduce the possibility of both ends of the grating electrode 40 being crushed by the spacing pillars 50 at the same time.

In one embodiment, when the extension direction of each straight line connecting any two matrix points 60 in the same first lattice point unit 71 intersects the first direction D1, the angle between each straight line and the first direction D1 may be selected to be greater than or equal to 10° and less than or equal to 90° to avoid overlapping of the two matrix points 60 on the same straight line along the first direction D1, which may be more beneficial to avoid the two matrix points 60 being located on the same grating electrode 40.

In one embodiment of the present disclosure, for each of the first matrix point units 71, the arrangement of the matrix points 60 in each of the first matrix units may be same.

For example, referring to FIGS. 9-12, the same arrangement of the present disclosure may mean that the number of matrix points 60 included in each first matrix point unit 71 may be same, and the patterns and sizes formed by each matrix point 60 in each first matrix point unit 71 may be exactly same. For example, the matrix points 60 in any first matrix point unit 71 may be regarded as a copy of the matrix points 60 in other first matrix point units 71. For example, when each first matrix point unit 71 includes two matrix points 60, the distance between the two matrix points 60 may be same, and the extension directions of the straight lines connecting two matrix points 60 may be the same. When each first matrix point unit 71 includes three matrix points 60, the structure of the triangle formed by the three matrix points 60 may be exactly same, and one triangle may be regarded as a copy and paste of other triangles. When each first matrix point unit 71 includes six matrix points 60, the structure of the hexagon formed by the six matrix points 60 may be exactly same, and one hexagon may be regarded as a copy and paste of other hexagons. When the arrangement of the matrix points 60 in the first matrix unit 71 is the same, the same size and shape can be used to form the first matrix units 71, and there may be no need to design different first matrix units 71 with different sizes and shapes. Thus, the manufacturing process of the spacing pillars 50 in the grating 100 may be simplified, and the production efficiency may be improved.

In one embodiment, in the grating provided by the embodiment of the present disclosure, one first matrix point unit may include two or more matrix points, and when one first matrix point unit includes three or more matrix points, the matrix points in the first matrix point unit may be arranged to form a corresponding polygon, such as a triangle, a quadrilateral, a pentagon, or a hexagon, etc. The polygons formed by the arrangement may be a regular polygon, and may also be embodied in other irregular shapes, such as a combined structure formed by polygons and matrix points. For example, one or more matrix points may be arranged in an area defined by the polygon, etc.

In one embodiment of the present disclosure, the length of the first unit vector V1 may be referred to as a, and the length of the second unit vector V2 may be referred to as b. 200 µm≤a≤2000 µm and 200 µm≤b≤2000 µm.

For example, referring to FIG. 5, when a first matrix point unit 71 includes one matrix point 60, among the four first matrix point units 71 that constitute the first quadrilateral 81, the four matrix points 60 may be respectively regarded as the four vertices of the quadrilateral 81. The length of the first unit vector V1 and the length of the second unit vector V2 may be respectively the lengths of two adjacent sides constituting the first quadrilateral 81. Considering that the matrix point 60 corresponding the spacing pillar 50 may be not a point, but a structure with a certain size, the above-mentioned lengths may be regarded as the length of the line between the centers of the matrix points 60 (spacing pillars 50). When a first matrix point unit 71 includes two or more matrix points 60, the center of the pattern formed by multiple matrix points 60 in the first matrix point unit 71 may be used as the measurement point, and the length of the first unit vector V1 and the length of the second unit vector V2 may correspond to the distance between the measurement points in the two first matrix point units 71.

It can be understood that when the length a of the first unit vector V1 or the length b of the second unit vector V2 is set to be less than 200 µm, the distance between two adjacent first matrix point units 71 may be small, and the matrix points 60 may be arranged densely. Thus, each grating electrode 40 may correspond to the spacing pillar 50, the risk of the grating electrode 40 being crushed may be increased. If the length a of the first unit vector V1 and the length b of the second unit vector V2 are set to be greater than 2000 µm, the distance between two adjacent first matrix point units 71 may be relatively large, resulting in the arrangement of the matrix points 60 to be loose, which may reduce the supporting performance of the spacing pillars 50 to the first substrate 10 and the second substrate 20. Thus, in the present disclosure, the length a of the first unit vector V1 and the length b of the second unit vector V2 may be set to: 200 µm≤a≤2000 µm, 200 µm≤b≤2000 µm. Such an arrangement may be beneficial to avoid the arrangement density of the first matrix point unit 71 in the grating 100 to be too large to reduce the risk of the grating electrode 40 being crushed by the spacing pillars 50, and it may be also beneficial to avoid the arrangement density of the first matrix point unit 71 in the grating 100 from being too small to ensure that the support reliability of the spacing pillars 50 to the substrate 10 and the second substrate 20 in the grating 100.

In one embodiment, the length a of the first unit vector V1 and the length b of the second unit vector V2 may be set to: 400 µm≤a≤1000 µm, 400 µm≤b≤1000 µm, for example, both may be selected to be 500 µm or so.

In one embodiment, the length a of the first unit vector V1 and the length b of the second unit vector V2 may be set to be equal within an allowable error range such that the arrangement of the first matrix point units in the grating may be more uniform. In some embodiments of the present disclosure, the length a of the first unit vector V1 and the length b of the second unit vector V2 may also be set to be unequal.

In one optional embodiment of the present disclosure, the distance S1 between two adjacent grating electrodes 40 may smaller than the diameter S2 of a single matrix point 60.

An optical device composed of a large number of parallel slits of equal width and equal spacing may be referred to as a grating. A commonly used grating may be formed by engraving a large number of parallel trenches on a glass sheet. The trenches may be the opaque parts (corresponding to the grating electrode 40 of the present disclosure). The smooth part between the two trenches may transmit light, which may be equivalent to one slit (corresponding to the distance between the two grating electrodes 40 of the present disclosure). The distance S1 between two adjacent grating electrodes 40 mentioned in the embodiment of the present disclosure may correspond to the width of the slit. The smaller the distance between two adjacent grating electrodes 40, the more the number of slits corresponding to the grating 100, the brighter and thinner the bright stripes, and the higher the resolution of the grating. In the present disclosure, when the distance between two adjacent grating electrodes 40 is set to be smaller than the diameter of a single matrix point 60 (corresponding to the diameter of the orthographic projection of the spacing pillar 50 on the first substrate 10), it may be beneficial to reduce the distance between the two adjacent grating electrodes 40 and may be in turn beneficial to improve the resolution of the grating 100.

In one embodiment, the distance S1 between two adjacent grating electrodes 40 may be greater than 0 and less than or equal to 2 µm. The smaller the distance in this range is, the better the resolution of the grating 100 may be improved.

Figure 13:
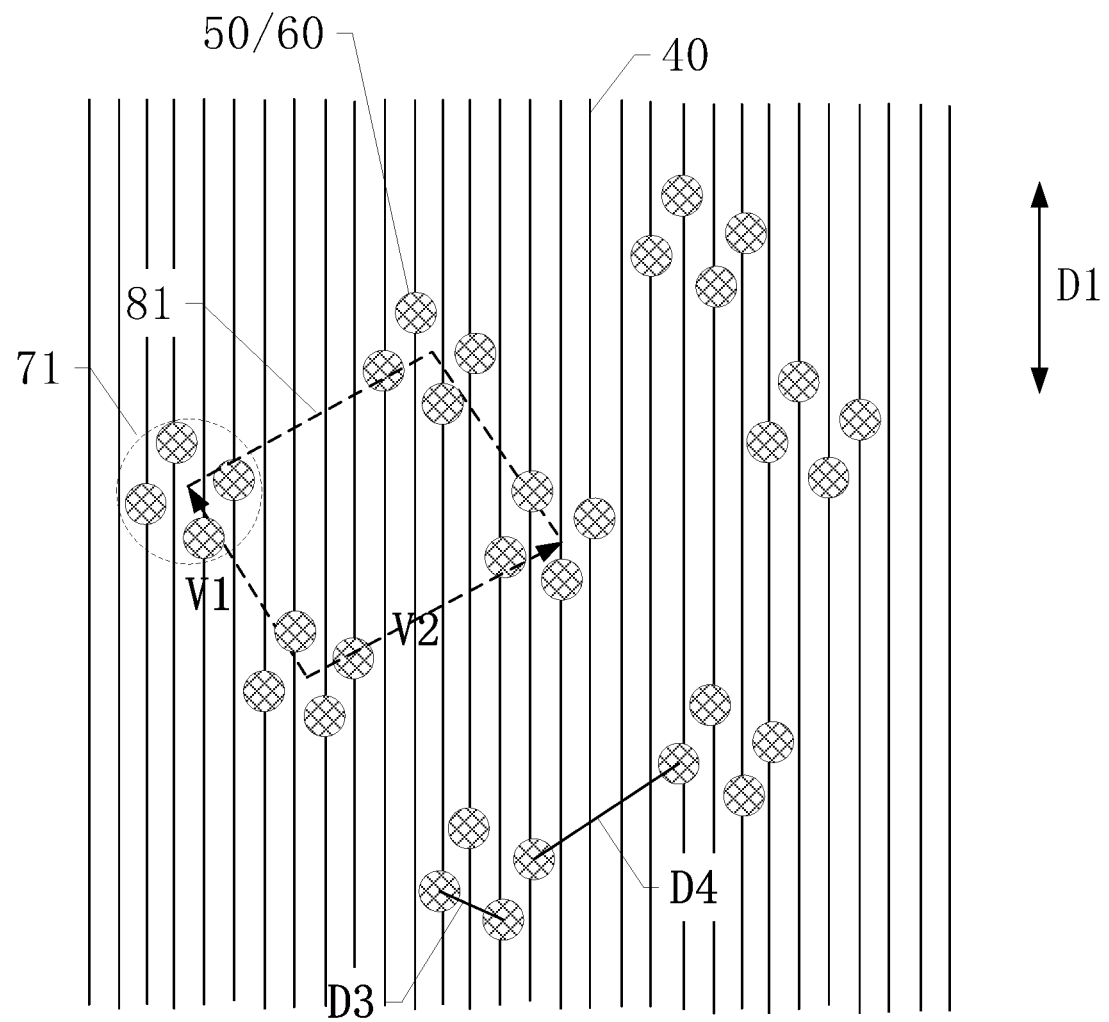
FIG. 13 illustrates another zoomed-in view of the region B in FIG. 3.

FIG. 13 illustrates another partially enlarged schematic diagram of the area B in FIG. 3. In one embodiment of the present disclosure, when the first matrix point unit 71 includes at least two matrix points 60, the distance between any two adjacent matrix points 60 in the same first matrix point unit 71 may be referred to as D3. Among the two adjacent first matrix point units 71, the minimum distance between one of the first matrix point units 71 and the other of the first matrix point units 71 may be referred to as D4, and 0.2≤D3/D4≤5.

FIG. 13 takes four matrix points 60 in the same first matrix point unit 71 as an example for description, and the four matrix points 60 in the same first matrix point unit 71 may form a small parallelogram. When the first matrix point unit 71 includes four matrix points 60, the distance D3 between any two adjacent matrix points 60 in the same first matrix point unit 71 may refer to the side length of the aforementioned small parallelogram; and it may refer to the distance between the centers of two adjacent lattice points 60. Among the two adjacent first matrix point units 71, the minimum distance D4 between one matrix point 60 in one first matrix point unit 71 and one matrix point 60 in the other first matrix point unit 71 may refer to the distance between the two nearest matrix points 60 among the two adjacent first matrix point units 71. The present disclosure may design 0.2≤D3/D4≤5 to avoid too large difference between the distance between two adjacent matrix points 60 in the same first matrix point unit 71 and the distance between two adjacent matrix points 60 in two adjacent first matrix point units 71 to improve the uniformity of the distribution of the matrix points 60 in the grating. For example, it may facilitate to improve the uniformity of the distribution of the spacing pillars 50 corresponding to the matrix points 60 in the grating to improve the uniformity of the supporting force of the spacing pillars 50 in different regions to the first substrate and the second substrate.

In another embodiment of the present disclosure, referring to FIGS. 11-12, when the first matrix point unit 71 includes at least three matrix points 60, the connection lines of multiple matrix points 60 of the same first matrix point unit 71 may form a regular polygon.

For example, FIG. 11 illustrates the configuration when the first matrix point unit 71 includes three matrix points 60, the connection lines of the three matrix points 60 may form an equilateral triangle. FIG. 12 shows the configuration when the first matrix point unit 71 includes six matrix points 60. The connection lines of the six matrix points 60 may form a regular hexagon. When the connection lines of the multiple matrix points 60 in the same first matrix point unit 71 form a regular polygon, the multiple matrix points 60 in the same first matrix point unit 71 may be arranged regularly, and the regularly arranged structure may be beneficial to simplify the manufacturing process of the spacing pillars 50, and the production efficiency of the grating may be improved.

Figure 14:
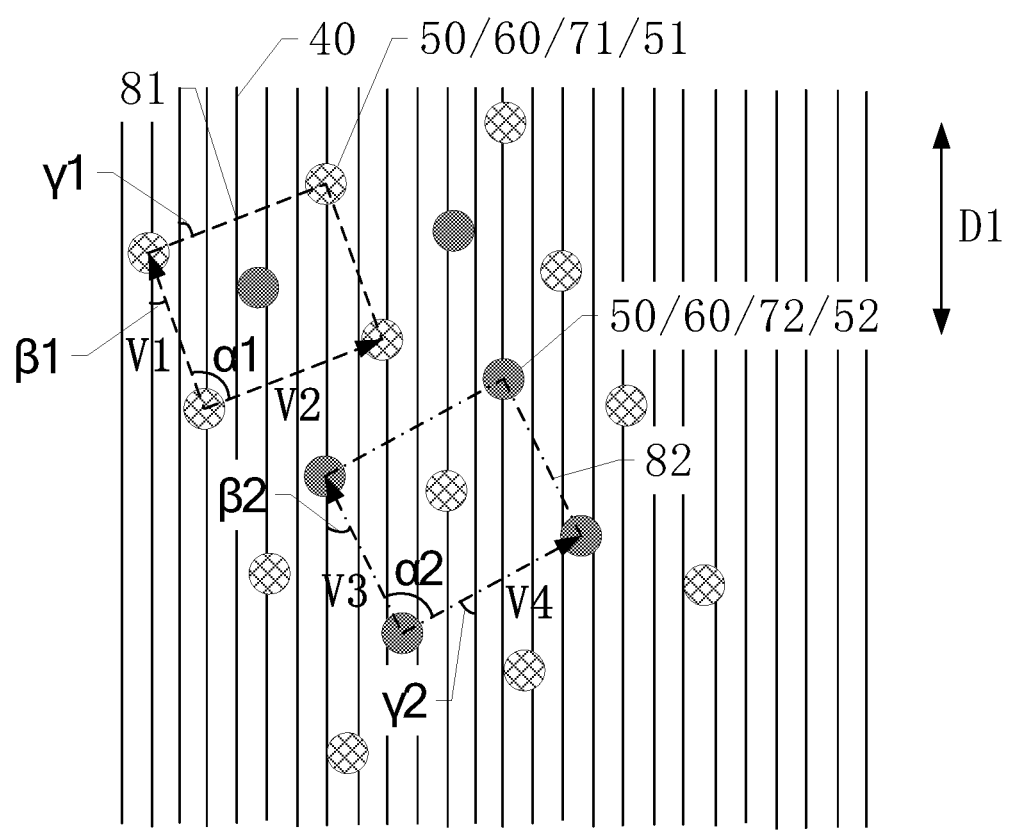
FIG. 14 illustrates another zoomed-in view of the region B in FIG. 3.

FIG. 14 is another exemplary partially enlarged schematic diagram of the area B in FIG. 3. As shown in FIG. 14, in one embodiment of the present disclosure, the plurality of matrix points 60 may include a plurality of second matrix point units 72. The plurality of second matrix point units 72 may be arranged in an array, and the smallest repeating unit may include four second matrix point units 72, and the four second matrix point units 72 may be located on the four vertices of the second quadrilateral 82. The two adjacent sides of the second quadrilateral 82 may be respectively defined as a third unit vector V3 and a fourth unit vector V4. The angle between the third unit vector V3 and the fourth unit vector the vectors V4 may be referred to as α2, and 0°<α2≤90°. The angle between the third unit vector V3 and the first direction D1 may be referred to as β2, β2≠0° and β2≠180°. The angle between the fourth unit vector V4 and the first direction D1 may be referred to as γ2, γ2≠0° and γ2≠180°.

The position of the second quadrilateral 82 may not coincide with the position of the first quadrilateral 81.

For example, referring to FIG. 14, this embodiment shows a solution in which a plurality of matrix points 60 include a first matrix point unit 71 and a second matrix point unit 72 at the same time in the grating provided by the embodiment of the present disclosure. For better embody the solution of the present disclosure, the first matrix point unit 71 and the second matrix point unit 72 are shown with different fillings in FIG. 14, which does not limit the material, etc., of the spacing pillars 50 corresponding to the first matrix point unit 71 and the second matrix point unit 72.

Similar to the arrangement of the first matrix unit 71, the smallest repeating unit of the second matrix point unit 72 may include four second matrix point units 72, and the four second matrix point units 72 may be located at the four vertices of the second quadrilateral 82. When the two adjacent sides of the second quadrilateral 82 are respectively defined as the third unit vector V3 and the fourth unit vector V4, and the third unit vector V3 and the fourth unit vector V4 may all not be parallel to the extension direction of the grating electrode 40. For example, the angle β2 between the third unit vector V3 and the first direction D1 may satisfy: β2≠0° and β2≠180°; and the angle γ2 between the fourth unit vector V4 and the first direction D1 may satisfy: γ2≠0°, γ2≠180°. The angle between the third unit vector V3 and the fourth unit vector V4 may be referred to as α2, and 0°<α2≤90°. Such a configuration may effectively avoid the situation that the spacing pillars 50 in the second matrix point units 72 corresponding to the third unit vector V3 is concentrated on the same grating electrode 40, and at the same time, it may effectively prevent the spacing pillars 50 in the two second matrix point units 72 corresponding to the fourth unit vector V4 from being concentrated on the same grating electrode 40. Thus, the number of spacing pillars 50 corresponding to the same grating electrode 40 may be effectively reduced, the risk of the grating electrode 40 being crushed by the spacing pillars 50 may be greatly reduced, and the possibility of crushing simultaneously of both ends of the same grating electrode 40 may be reduced. Accordingly, the reliability of the grating electrode 40 in transmitting the driving signal may be improved, and the reliability of the use of the grating 100 may be enhanced.

In one embodiment, when the matrix points 60 include the first matrix point units 71 and the second matrix point units 72 at the same time, the arrangement density of the second matrix point units 72 and the arrangement density of the first matrix point units 71 may be set to be the same. Thus, the overall arrangement of the first matrix point unit 71 and the second matrix point unit 72 may be more uniform. In some other embodiments of the present disclosure, the arrangement density of the second matrix unit 72 and the arrangement density of the first matrix unit 71 may also be set to be different, and may be flexibly set according to actual conditions.

In one embodiment, when the matrix points 60 include both the first matrix point unit 71 and the second matrix point unit 72, the number of matrix points 60 included in one second matrix point unit 72 may be the same as or different from the number of matrix points 60 included in one first matrix point unit 71. For example, in the embodiment shown in FIG. 14, a first matrix point unit 71 may include one matrix point 60, and a second matrix point unit 72 may also include one matrix point 60. In some other embodiments of the present disclosure, the number of matrix points 60 included in the first matrix point unit 71 and the second matrix point unit 72 may be flexibly set according to actual requirements.

The shape and size of the second quadrilateral may all be same as those of the first quadrilateral, or the shape of the second quadrilateral may be same as the shape of the first quadrilateral. The shape of the second quadrilateral may be different from the shape of the first quadrilateral. For example, the length ratio of the adjacent two sides of the quadrilateral may be different, or the angle between the adjacent two sides may be different.

Figure 15:
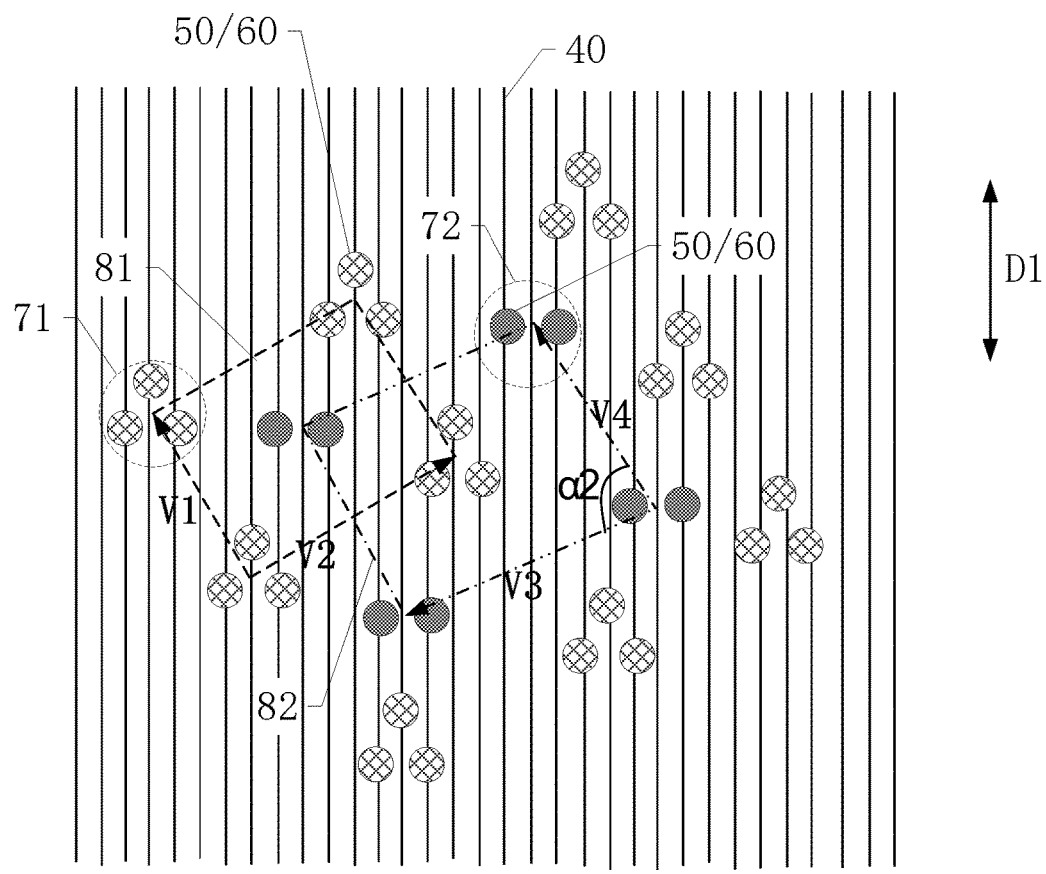
FIG. 15 illustrates another zoomed-in view of the region B in FIG. 3.

FIG. 15 shows another exemplary partially enlarged schematic diagram of the area B in FIG. 3. In one embodiment of the present disclosure, one second matrix point unit 72 may correspond to one first quadrilateral 81; and one of the second lattice point units 72 may be located within the range defined by the first quadrilateral 81.

For example, referring to FIG. 15, when the matrix point unit 60 includes the first matrix point unit 71 and the second matrix point unit 72, the smallest repeating unit of the first matrix point unit 71 may correspond to the first quadrilateral 81, and the smallest repeating unit of the second matrix point unit 72 may correspond to the second quadrilateral 82. At this time, the matrix point unit 72 may be located within the range defined by the first quadrilateral 81. Thus, the position of the second matrix point unit 72 may be set according to the position of the first quadrilateral 81 corresponding to the first matrix point unit 71. Such a configuration may simplify the manufacturing process after the matrix point unit 72 is introduced into the grating 100.

In one embodiment, when the second matrix point unit 72 is arranged in the range defined by the first quadrilateral 81, the second matrix point unit 72 may be arranged in the central area of the first quadrilateral 81. The central area may refer to the area with the intersection point of the two diagonals of the quadrilateral 81 as the center and a certain size as the radius. Such a configuration may facilitate that the first matrix point unit 71 and the second matrix point unit 72 may be arranged more uniformly in the grating 100. Thus, the supporting force received by the first substrate 10 and the second substrate 20 in each area may be more uniform.

In one embodiment of the present disclosure, among the spacing pillars 50 overlapping the same grating electrode 40, the distance between two adjacent spacing pillars 50 may be greater than or equal to twice the length of the first unit vector V1, or greater than or equal to twice the length of the second unit vector V2.

In the grating provided by the related art, for example, referring to FIG. 2, along the extending direction of the grating electrode 40', among the plurality of spacing pillars 50' corresponding to the same grating electrode 40', the distance between two adjacent spacing pillars is equal to the length of the first unit vector V1', and the distance between two adjacent spacing pillars is smaller than the length of the second unit vector V2', which may result in a larger number of spacing pillars corresponding to the same grating electrode 40', and greatly increase the risk of the grating electrode being crushed. In the present disclosure, for example, in conjunction with FIG. 5, the distance between two adjacent spacing pillars 50 overlapping with the same grating electrode 40 may be set to be greater than or equal to twice the length of the first unit vector V1, and greater than or equal to twice the length of the second unit vector V2. Comparing with the prior art, the distance between two adjacent spacing pillars in the spacing pillars overlapping with the same grating electrode may be increased. When the electrode length is fixed, it may be equivalent to reducing the number of spacing pillars overlapping with the same grating electrode, thus the risk of the grating electrode being crushed by the spacing pillars may be significantly reduced.

In one embodiment of the present disclosure, in the spacing pillars overlapping with the same grating electrode, the distance between two adjacent spacing pillars may be greater than twice the length of the first unit vector, such as 5 times, 8 times, or 10 times, etc. Similarly, the distance between two adjacent spacers may also be greater than twice the length of the second unit vector, such as 5 times, 8 times, or 10 times, etc. The larger the times, the more it may be beneficial to reduce the number of spacing pillars overlapping with the grating electrode, and the more beneficial it may be to reduce the risk of the grating electrode being crushed by the spacing pillars.

In another embodiment of the present disclosure, referring to FIG. 4, along the direction perpendicular to the first substrate 10, the height of each spacing pillar 50 may be equal.

For example, FIG. 4 shows a situation where the heights of the spacing pillars 50 in the grating 100 may be all equal along the direction perpendicular to the first substrate 10. At this time, along the direction perpendicular to the first substrate 10, one end of the spacing pillar 50 may be in contact with the first substrate 10, and the other end may be in contact with the second substrate 20 such that the first substrate 10 and the second substrate 20 may be better supported, and the first substrate 10 and the second substrate 20 may be prevented from being pressed by the outside; and the phenomenon of deformation caused by the applied force may be avoided. Further, the spacing pillars 50 may also effectively control the thickness of the liquid crystal layer 30.

Figure 16:
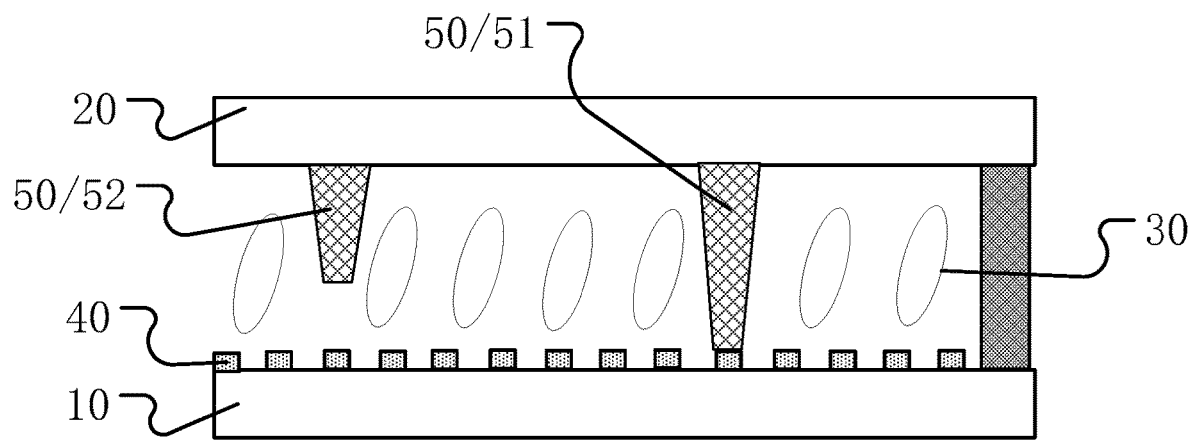
FIG. 16 illustrates another AA-sectional view of the grating in FIG. 3.

FIG. 16 shows another AA cross-sectional view of the grating 100 in FIG. 3. As shown in FIG. 4, in one embodiment of the present disclosure, the spacing pillars 50 may include main spacing pillars 51 and auxiliary spacing pillars 52. Along the direction perpendicular to the first substrate 10, the height of the main spacing pillars 51 may be greater than the height of the auxiliary spacing pillars 52. The main spacing pillars 51 may be evenly arranged, and the auxiliary spacing pillars 52 may be evenly arranged.

For example, FIG. 16 shows a situation in which the spacing pillars 50 in the grating 100 may include a main spacing pillar 51 and an auxiliary spacing pillar 52. The difference between the main spacing pillars 51 and the auxiliary spacing pillars 52 is that the height of the two may be different. Along the direction perpendicular to the first substrate 10, the height of the main spacing pillar 51 may be greater than the height of the auxiliary spacing pillar 52. The main spacing pillar 51 with the larger height may support the first substrate 10 and the second substrate 20 while maintaining the thickness of the liquid crystal cell in the grating 100. When being pressed by the outside, the auxiliary spacing pillar 52 may also play a further supporting role to prevent the first substrate 10 or the second substrate 20 from being significantly deformed. In one embodiment of the present disclosure, the main spacing pillars 51 may be evenly arranged in the grating 100, which may be beneficial to improve the uniformity of the supporting force of the main spacing pillars 51 in different areas of the first substrate 10 and the second substrate 20. The configuration that the auxiliary spacing pillars 52 are evenly arranged in the grating 100 may be beneficial to improve the uniformity of the supporting force of the auxiliary spacing pillars 52 in different regions of the first substrate 10 and the second substrate 20.

In one embodiment of the present disclosure, when the first matrix point unit 71 includes at least two spacing pillars 50, the same first matrix point unit 71 may include at least one main spacing pillar 51 and at least one auxiliary spacing pillar 52.

For example, referring to FIG. 9, when the first matrix point unit 71 includes two or more spacing pillars 50, the spacing pillars 50 corresponding to the matrix points 60 in the first matrix point unit 71 may also include the main spacing pillars 51 and the auxiliary spacing pillars 52 such that the main spacing pillars 51 and the auxiliary spacing 52 may be arranged more uniformly in the grating 100. Such an arrangement may be beneficial to improve the uniformity of the support force received by the difference areas of the first substrate 10 and the second substrate 20.

In one embodiment, when the grating includes both the first matrix point unit 71 and the second matrix point unit 72, for example, referring to FIG. 14, the spacing pillar 50 corresponding to the first matrix point unit 71 may be embodied as the main spacing pillar 51, and the spacing pillar 50 corresponding to the second matrix point unit 72 may be embodied as the auxiliary spacing pillar 52. In some other embodiments of the present disclosure, the spacing pillar corresponding to the first matrix point unit 71 may also be embodied as the auxiliary matrix point pillar, and the spacing pillar corresponding to the second matrix point unit 72 may also be embodied as the main spacing pillar. It should be noted that when the spacing pillars 50 include both the main spacing pillar and the auxiliary spacing pillar, the density of the main spacing pillar and the auxiliary spacing pillar may be set to be the same or different, which is not specifically limited in the present disclosure.

In one embodiment of the present disclosure, referring to FIG. 5, the width of the grating electrode 40 may be smaller than the outer diameter S2 of the orthographic projection of the spacing pillar 50 on the first substrate 10.

For example, the smaller the width of the grating electrode 40 and the smaller the distance between adjacent grating electrodes 40, the higher the resolution of the grating 100 will be. To ensure the supporting reliability of the spacing pillars 50, the outer diameter of the orthographic projection of the spacing pillars 50 on the first substrate 10 may usually be set in a range of approximately 5 µm to 20 µm. In the present disclosure, when the width of the grating electrode 40 is designed to be smaller than the outer diameter of the orthographic projection of the spacing pillar 50 on the first substrate 10, it may be beneficial to reduce the width of the grating electrode 40, and thus to improve the resolution of the grating 100.

Figure 17:
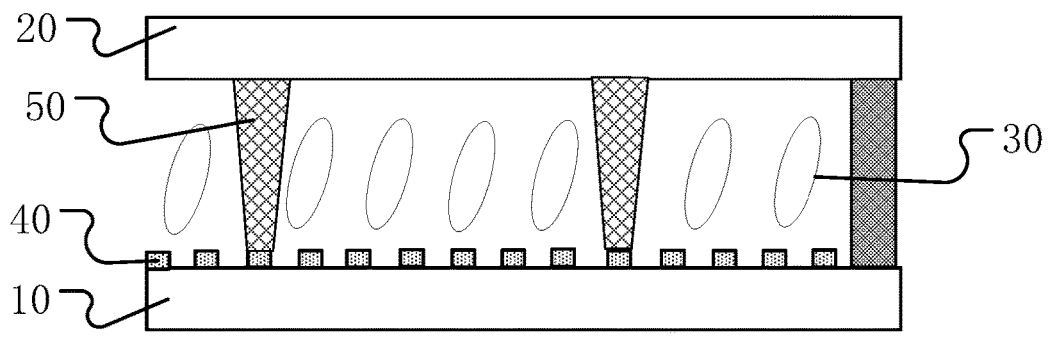
FIG. 17 illustrates another AA-sectional view of the grating in FIG. 3.

FIG. 17 is another exemplary AA-sectional view of the grating in FIG. 3. As shown in FIG. 16 and FIG. 17, the grating 100 may further include a liquid crystal layer 30 located between the first substrate 10 and the second substrate 20. When a driving voltage is applied to the grating electrode 40, the liquid crystal in the liquid crystal layer 30 may be driven to deflect. The spacing pillars 50 may play a supporting role between the first substrate 10 and the second substrate 20 to prevent the first substrate 10 and the second substrate 20 from deforming under the action of external force. Further, the spacing pillars 50 may also be used to maintain the space of the liquid crystal layer 30 between the first substrate 10 and the second substrate 20.

Figure 18:
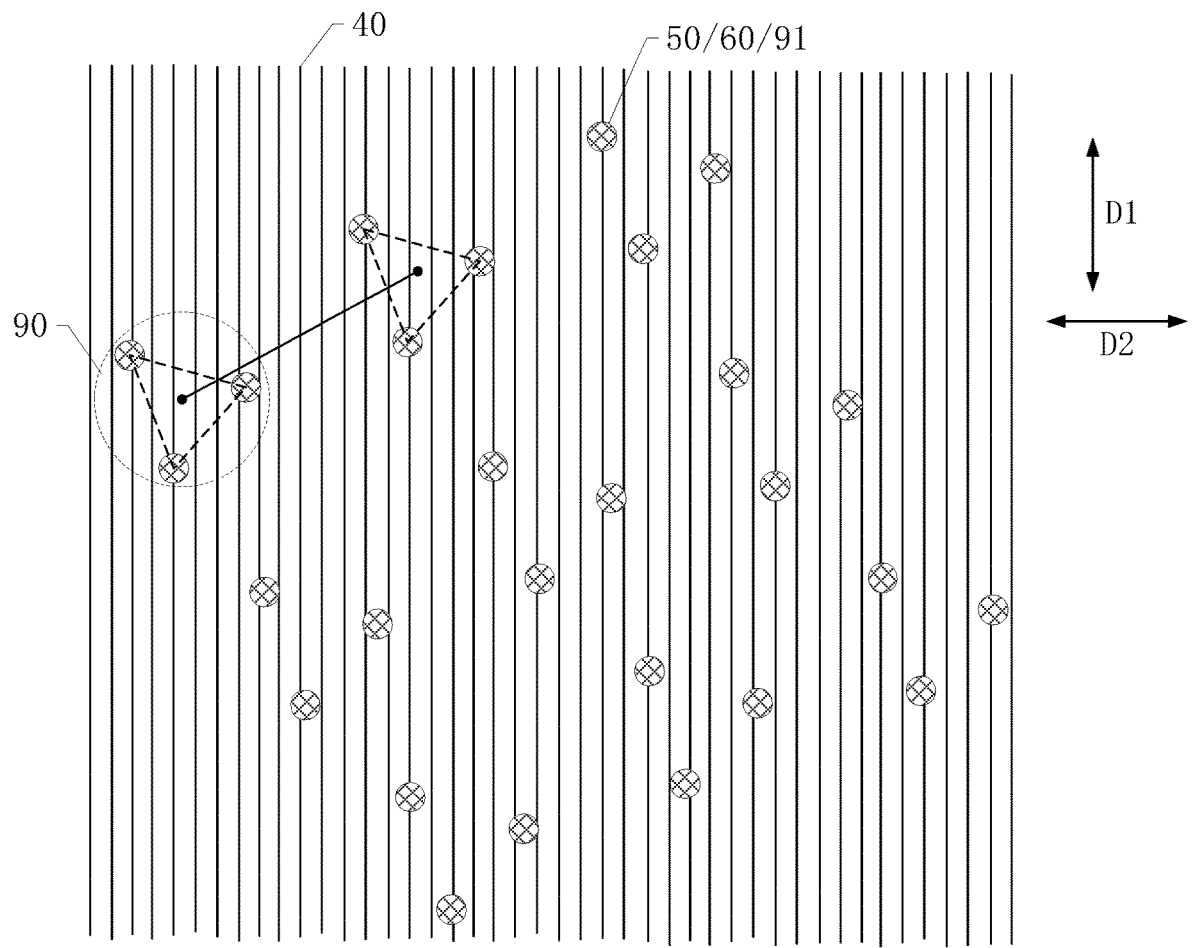
FIG. 18 illustrates a zoomed-in view of another exemplary grating consistent with various disclosed embodiments of the present disclosure.

The present disclosure also provides another type of grating. FIG. 18 shows a partially enlarged schematic diagram of another exemplary grating consistent with various disclosed embodiments of the present disclosure. The cross-sectional structure of the grating may be referred to FIG. 4.

As shown in FIG. 18 and FIG. 4, the grating may include a first substrate 10 and a second substrate 20 arranged opposite to each other, and a plurality of grating electrodes 40 and a plurality of spacing pillars 50 located between the first substrate 10 and the second substrate 20. The plurality of the grating electrodes 40 may extend along a first direction D1 and may be arranged along a second direction D2. The first direction D1 may intersect the second direction D2.

On a plane parallel to the first substrate 10, the positions where the spacing pillars 50 are located may be referred to as matrix points. The plurality of spacing pillars 50 may correspond to the plurality of matrix points 60, and the plurality of matrix points 60 may include a plurality of first matrix points 91. The plurality of first matrix points 91 may be divided into a plurality of repeating units. Each repeating unit may include at least three of the first matrix points 91, and the repeating unit corresponding to the shape having the smallest perimeter and area may be referred to as a first matrix point group 90, and the extension direction of the line between any two of the first matrix points 91 in the first matrix point group 90 may be different from the first direction D1.

Referring to FIG. 18, in the grating provided in this embodiment, each repeating unit may be overlapped by multiple translations (not including rotation). The repeating unit corresponding to the shape with the smallest perimeter and area may be referred to as the first matrix point group 90. The shape may be a convex shape formed by connecting the first matrix points 91 located on the outermost side. The so-called convex shape may refer that, as far as the straight line of each side of the shape is concerned, the shape is located on the same side of the straight line, and the straight line does not divide the shape into two parts. In one embodiment, the graphic shape corresponding to the above repeating unit may be, for example, a regular polygon (equal triangle, rectangle, regular pentagon, regular hexagon, etc.), or a general polygon, such as a trapezoid, or other irregular graphics, etc. FIG. 18 only takes the shape of the first matrix point group 90 as a triangle as an example for description.

In the grating provided by the embodiment of the present disclosure, the extension direction of the connection line between any two first matrix points 91 in the first matrix point group 90 is different from the first direction D1, that is, it may be different from the extension direction of the grating electrode 40. Such a configuration may effectively avoid the situation that any two first matrix points 91 in the first matrix point group 90 may be concentrated on the same grating electrode 40. Thus, the number of spacing pillars 50 corresponding to the same grating electrode 40 may be effectively reduced, and the risk of the grating electrode 40 being crushed by the spacing pillars 50 may be significantly reduced, and the possibility of both ends of the same grating electrode 40 being crushed by the spacing pillars 50 at the same time may be significantly reduced. Accordingly, the reliability of the grating electrode 40 to transmit driving signals may be improved, and the reliability of the grating may be improved.

In another embodiment of the present disclosure, referring to FIG. 18, for two adjacent first matrix point groups 90, the extension direction of the line between the center points of the first matrix point groups 90 may be different from the first direction D1.

Referring to FIG. 18, the extension direction of the line between the center points of two adjacent first matrix point group 90 may intersect the first direction D1, that is, may intersect the extension direction of the grating electrode 40. It can be understood that when the extension direction of the line between the centers of two adjacent first matrix point groups 90 is same as the first direction D1, that is, when the translation direction of the first matrix point groups 90 is same as the first direction D1, the arrangement of the first matrix points 91 in the two adjacent first matrix points groups 90 may be the same, the situation that two first matrix points 91 having in the same arrangement position in the two adjacent first matrix points group 90 are located on the same grating electrode 40 may inevitably occur. Such a configuration may not facilitate to reduce the number of spacers 50 corresponding to the same grating electrode 40. In the present disclosure, when the extension direction of the line between the center points of two adjacent first matrix point groups 90 is set to be different from the first direction D1, that is, the translation direction of the first matrix point groups 90 and the first direction D1 may be set to be different, the possibility that the two first matrix points 91 in the same arrangement position in the two adjacent first matrix points 90 are arranged on the same group of grating electrodes 40 at the same time may be effectively avoided. Thus, the number of matrix point pillars 50 corresponding to the same grating electrode 40 may be effectively reduced; and the risk of the grating electrode 40 being crushed by the spacing pillars 50 may be reduced.

It should be noted that in the present invention, the center point of the first matrix point group 90 may refer to the center point of the convex shape formed by connecting the first matrix points 91 in the first matrix point group 90.

Figure 19:
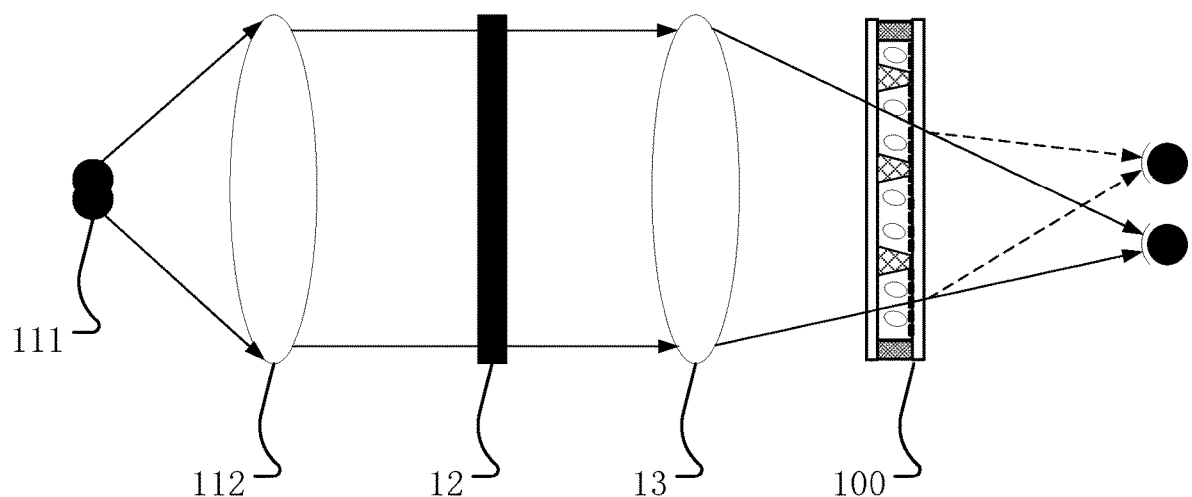
FIG. 19 illustrates an exemplary 3D holographic display device consistent with various disclosed embodiments of the present disclosure.

The present disclosure also provides a 3D holographic display device. FIG. 19 illustrates an exemplary 3D holographic display device consistent with various disclosed embodiments of the present disclosure As shown in FIG. 19, the 3D holographic display device 200 may include a light source device 111. The light source device 111 may be used to emit coherent RGB three-color light in a time sequence.

The 3D holographic display device 200 may also include a beam expanding collimating component 112. The beam expanding collimating component 112 may be used to perform the beam expanding and collimating processing on the light emitted by the light source device 111.

Further, the 3D holographic display device 200 may include a spatial light modulator 12. The spatial light modulator may be configured to sequentially perform phase modulation and amplitude modulation on the light emitted by the beam expanding collimator component 112.

Further, the 3D holographic display device 200 may include a field lens 13 and a grating 100. The field lens 13 may be used at least to improve the ability of the edge light of the light emitted by the spatial light modulator 12 to enter the grating 100; and the grating 100 may be used to form a left-eye image and a right-eye image based on the incident light image.

The grating 100 may be a present disclosed grating in any of the above-mentioned embodiments, or other appropriate grating.

The 3D holographic display device provided by the embodiment of the present disclosure may adopt the grating 100 provided in the foregoing embodiments, and the grating 100 may form a left-eye image and a right-eye image based on the incident light to realize a large-angle holographic display. In the 3D holographic display device provided by the embodiment of the present disclosure, by setting the arrangement of the first matrix point units, the number of spacing pillars corresponding to the same grating electrode may be effectively reduced, and the risk of the grating electrode being crushed by the spacing pillars may be significantly reduced. Therefore, the reliability of the driving signal transmitted by the grating electrode may be improved, and the display reliability of the 3D holographic display device may be significantly enhanced.

As for the display device provided by the present disclosure, because it may correspond to the grating disclosed in the above embodiments, the description may be relatively simple, and the related parts may be referred to the description of the corresponding part of the grating.

In summary, the grating and 3D holographic display device provided by the present disclosure may at least achieve the following beneficial effects.

In the grating and the 3D holographic display device provided by the embodiment of the present disclosure, the grating may include a first substrate and a second substrate arranged oppositely, and a liquid crystal layer, grating electrodes and spacing pillars located between the first substrate and the second substrate. When a driving voltage is applied to the grating electrode, the liquid crystal in the liquid crystal layer may be driven to deflect. The spacing pillars may support the first substrate and the second substrate to prevent the first substrate and the second substrate from deforming under the action of external force. The position of the spacing pillars in this disclosure may be referred to as matrix points. The plurality of matrix points may include multiple first matrix point units arranged in an array, and the smallest repeating unit of the multiple first matrix point units may include four first matrix points. The four first matrix point units may be located at the four vertices of a first quadrilateral. When the adjacent two sides of the first quadrilateral are defined as the first unit vector and the second unit vector, in the present disclosure, the first unit vector and the second unit vector may not be parallel to the extension direction of the grating electrode. The angle between the first unit vector and the second unit vector may be referred to as $\alpha 1$, and $0° < \alpha 1 \leq 90°$. Such a configuration may effectively avoid the situation that the spacing pillars in the two first matrix point units corresponding to the first unit vector are concentrated on the same grating electrode. At the same time, the concentration of the spacing pillars in the two first matrix point units corresponding to the second unit vector on the same grating electrode may also be avoided. Thus, the number of spacing pillars corresponding to the same grating electrode may be effectively reduced, and the risk of the grating electrode being crushed by the spacing pillars may be greatly reduced. Accordingly, the reliability of the driving signal transmitted by the grating electrode may be improved; and the reliability of the grating and the display reliability of the 3D holographic display device may be enhanced.

Although some specific embodiments of the present disclosure have been described in detail through examples, those skilled in the art should understand that the above examples are only for illustration and not for limiting the scope of the present disclosure. Those skilled in the art should understand that the above embodiments can be modified without departing from the scope and spirit of the present disclosure. The scope of the present disclosure may be defined by the appended claims.

What is claimed is:
1. A grating, comprising:
   a first substrate and a second substrate disposed opposite to the first substrate; and a plurality of grating electrodes and a plurality of spacing pillars disposed between the first substrate and the second substrate, wherein:

the plurality of grating electrodes extend along a first direction and are arranged along a second direction;

along a plane parallel to the first substrate, positions of the plurality of spacing pillars are referred to as a plurality of matrix points;

the plurality of matrix points include multiple first matrix point units;

along the plane parallel to the first substrate, the multiple matrix point units are arranged as an array;

a minimum repeating unit of the array includes four first matrix point units of the multiple first matrix point units;

the four matrix point units are located at four vertices of a first quadrilateral;

two adjacent sides of the first quadrilateral are defined as a first unit vector and a second unit vector, respectively;

an angle between the first unit vector and the second unit vector is $\alpha 1$, and $0°\leq\alpha 1\leq 90°$;

an angle between the first unit vector and the first direction is $\beta 1$, and $\beta 1\neq 0°$, and $\beta 1\neq 180°$; and an angle between the second unit vector and the first direction is $\gamma 1$, and $\gamma 1\neq 0°$, and $\gamma 1\neq 180°$.

2. The grating according to claim 1, wherein:
the first direction is not parallel to a diagonal of the first quadrilateral.

3. The grating according to claim 1, wherein:
$45°\leq\alpha 1\leq 90°$.

4. The grating according to claim 3, wherein:
$60°\leq\alpha 1\leq 90°$.

5. The grating according to claim 1, wherein:
$10°\leq\beta 1\leq 80°$; and
$10°\leq\gamma 1\leq 80°$.

6. The grating according to claim 1, wherein:
a first matrix point unit of the multiple first matrix point units includes at least two matrix points; and
in a same first matrix point unit of the multiple first matrix point units, among straight lines connecting any two matrix points, an extension direction of at least one of the straight lines intersects the first direction.

7. The grating according to claim 1, wherein:
a distance between two adjacent grating electrodes is smaller than a diameter of a single matrix point of the plurality of matrix points.

8. The grating according to claim 1, wherein:
when a first matrix point unit of the plurality of matrix point units includes at least two matrix points, a distance between any two adjacent matrix points in the same first matrix point unit is D3;
in two adjacent first matrix point units of the plurality of matrix point units, a minimum distance between one matrix point in one of the two adjacent first matrix point units and one matrix point in another of the two adjacent first matrix point units is D4; and
$0.2\leq D3/D4\leq 5$.

9. The grating according to claim 1, wherein:
when a first matrix point unit of the plurality of first matrix point units includes at least three matrix points, connection lines of multiple matrix points in the same first matrix point unit form a regular polygon.

10. The grating according to claim 1, wherein:
the plurality of matrix points include multiple second matrix point units;
the multiple matrix point units are arranged as an array;
a minimum repeating unit of the array include four second matrix point units;
the four second matrix point units are located at four vertices of a second quadrilateral;
two adjacent sides of the second quadrilateral are defined as a third unit vector and a fourth unit vector, respectively;
an angle between the third unit vector and the fourth unit vector is $\alpha 2$, and $0°\leq\alpha 2\leq 90°$;
an angle between the third unit vector and the first direction is $\beta 2$, and $\beta 2\neq 0°$, and $\beta 2\neq 180°$;
an angle between the fourth unit vector and the first direction is $\gamma 2$, and $\gamma 2\neq 0°$, and $\gamma 2\neq 180°$; and
a position of the second quadrilateral does not overlap with a position of the first quadrilateral.

11. The grating according to claim 10, wherein:
one second matrix point unit of the multiple second matrix point units corresponds to one first quadrilateral; and
the second matrix point unit is located within a region limited by the first quadrilateral.

12. The grating according to claim 1, wherein:
among spacing pillars of the plurality of spacing pillars overlapping a same grating electrode of the plurality of grating electrodes, a distance between two adjacent spacing pillars is greater than or equal to twice of a length of the first unit vector, or greater than or equal to twice of a length of the second unit vector.

13. The grating according to claim 1, wherein:
along a direction perpendicular to the first substrate, heights of all of the plurality of spacing pillars are equal.

14. The grating according to claim 1, wherein:
the plurality of spacing pillars include main spacing pillars and auxiliary spacing pillars;
along a direction perpendicular to the first substrate, a height of the main spacing pillars is greater than a height of the auxiliary spacing pillars;
the main spacing pillars are uniformly distributed;
the auxiliary spacing pillars are uniformly distributed; and
when a first matrix point unit of the plurality of first matrix point units includes at least two spacing pillars, a same first matrix point unit of the plurality of first matrix point units includes at least one main spacing pillar and at least one auxiliary spacing pillar.

15. The grating according to claim 1, wherein:
a width of a grating electrode of the plurality of grating electrodes is smaller than an outer diameter of an orthographic projection of a spacing pillar of the plurality of spacing pillars on the first substrate.

16. The grating according to claim 1, wherein:
the first quadrilateral is a first parallelogram.

17. The grating according to claim 1, further comprising:
a liquid crystal layer between the first substrate and the second substrate.

18. A grating, comprising:
a first substrate and a second substrate disposed opposite to the first substrate; and
a plurality of grating electrodes and a plurality of spacing pillars disposed between the first substrate and the second substrate, wherein:

the plurality of grating electrodes extend along a first direction, and are arranged along a second direction;

the first direction intersects the second direction;

along a plane parallel to the first substrate, positions of the plurality of spacing pillars are referred to as matrix points;

the plurality of matrix points include multiple first matrix points;

the plurality of first matrix points are dividend into a plurality of repeating units;

each repeating unit includes at least three first matrix points of the plurality of first matrix points;

a repeating unit corresponding to a shape having a minimum perimeter and area is a first matrix point group; and an extension direction of a connection line of any two first matrix points in the first matrix point group is different from the first direction.

19. The grating according to claim 18, wherein:

for two adjacent first matrix point groups, an extension direction of a connection line of centers of the two adjacent first matrix point groups is different from the first direction.

20. A three-dimensional holographic display device, comprising:

a light source device, configured to emit coherent RGB three-color light in a time sequence;

a beam expanding collimating component, configured to perform a beam expanding and collimating processing on the light emitted by the light source device;

a spatial light modulator, configured to sequentially perform a phase modulation and an amplitude modulation on the light emitted by the beam expanding collimator component;

a field lens, configured at least to improve an ability of an edge light of the light emitted by the spatial light modulator to enter a grating; and the grating, configured to form a left-eye image and a right-eye image based on the incident light image, wherein the grating includes:

a first substrate and a second substrate disposed opposite to the first substrate; and a plurality of grating electrodes and a plurality of spacing pillars disposed between the first substrate and the second substrate, wherein:

the plurality of grating electrodes extend along a first direction and are arranged along a second direction;

along a plane parallel to the first substrate, positions of the plurality of spacing pillars are referred to as a plurality of matrix points;

the plurality of matrix points include multiple first matrix point units;

along the plane parallel to the first substrate, the multiple matrix point units are arranged as an array;

a minimum repeating unit of the array includes four first matrix point units of the multiple first matrix point units;

the four matrix point units are located at four vertices of a first quadrilateral;

two adjacent sides of the first quadrilateral are defined as a first unit vector and a second unit vector, respectively;

an angle between the first unit vector and the second unit vector is $\alpha 1$, and $0° \leq \alpha 1 \leq 90°$;

an angle between the first unit vector and the first direction is $\beta 1$, and $\beta 1 \neq 0°$, and $\beta 1 \neq 180°$; and an angle between the second unit vector and the first direction is $\gamma 1$, and $\gamma 1 \neq 0°$, and $\gamma 1 \neq 180°$.

* * * * *